(12) United States Patent  
Yokokawa et al.

(10) Patent No.: US 8,767,881 B2
(45) Date of Patent: Jul. 1, 2014

(54) SIGNAL PROCESSING APPARATUS, SIGNAL PROCESSING METHOD, AND PROGRAM

(75) Inventors: Takashi Yokokawa, Kanagawa (JP); Ryoji Ikegaya, Kanagawa (JP); Yuji Shinohara, Kanagawa (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/236,706

(22) Filed: Sep. 20, 2011

(65) Prior Publication Data

US 2012/0106608 A1    May 3, 2012

(30) Foreign Application Priority Data

Oct. 27, 2010 (JP) ................................. 2010-240783

(51) Int. Cl.
  *H04L 27/14*    (2006.01)
  *H04L 27/16*    (2006.01)
  *H04L 27/22*    (2006.01)

(52) U.S. Cl.
  USPC ........... 375/324; 375/340; 375/348; 375/341; 375/262; 375/232; 455/63.1; 455/65; 455/228; 455/296; 455/307

(58) Field of Classification Search
  USPC ......... 375/324, 340, 346, 348, 350, 341, 262, 375/265, 232, 234, 235, 326; 455/63.1, 65, 455/228, 296, 307
  See application file for complete search history.

(56) References Cited

U.S. PATENT DOCUMENTS

2008/0232453 A1*  9/2008  Cohen et al. ................... 375/232
2009/0190695 A1   7/2009  Yokokawa et al.
2010/0215107 A1*  8/2010  Yang ............................. 375/260

FOREIGN PATENT DOCUMENTS

JP    2009-182552    8/2009

OTHER PUBLICATIONS

U.S. Appl. No. 13/235,917, filed Sep. 19, 2011, Ikegaya, et al.

* cited by examiner

*Primary Examiner* — Phuong Phu
(74) *Attorney, Agent, or Firm* — Sony Corporation

(57) ABSTRACT

A signal processing apparatus is disclosed which includes: a detection section configured such that based on a result of the error correction of a signal generated by a single carrier system, the detection section detects the presence or absence of spectrum inversion in the signal; and a selection section configured such that if the detection section detects the spectrum inversion, the selection section selects the spectrally inverted signal as the signal subject to the error correction, and that if the detection section does not detect the spectrum inversion, then the selection selects the spectrally uninverted signal as the signal subject to the error correction.

10 Claims, 23 Drawing Sheets

F I G . 4
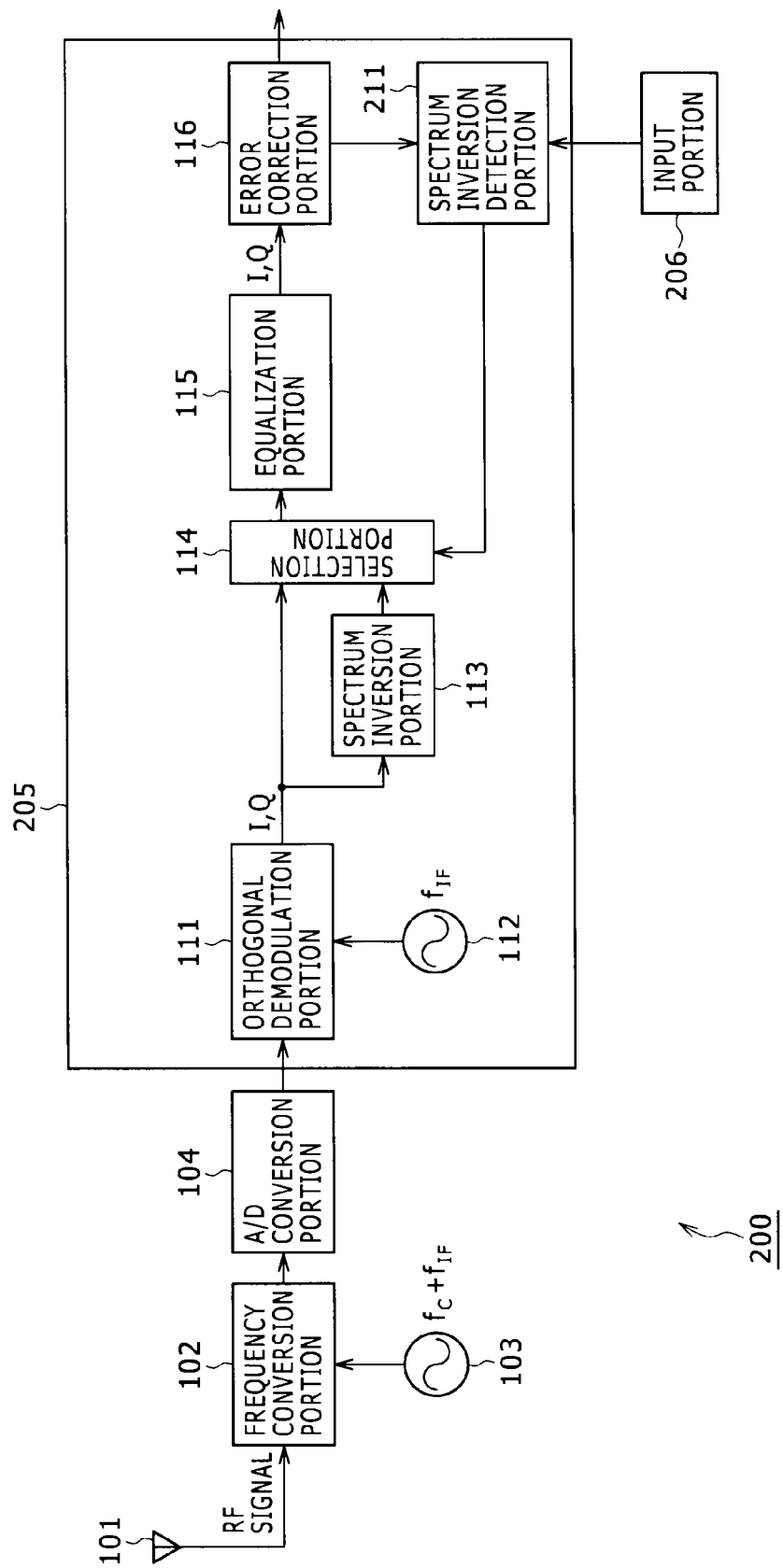

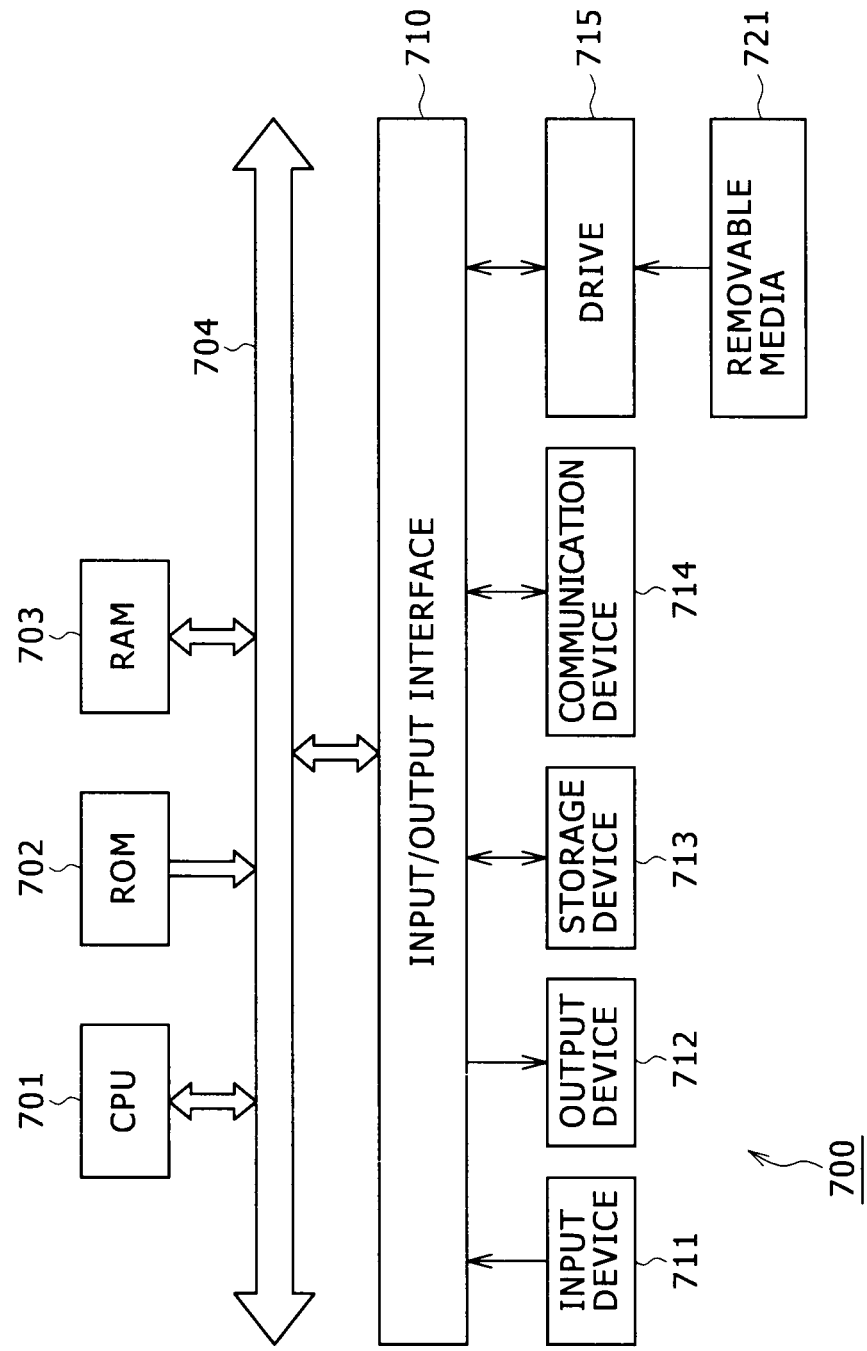

SIGNAL PROCESSING APPARATUS, SIGNAL PROCESSING METHOD, AND PROGRAM

BACKGROUND

The present disclosure relates to a signal processing apparatus, a signal processing method, and a program. More particularly, the disclosure relates to a signal processing apparatus, a signal processing method, and a program for detecting and correcting spectrum inversion in a more generalized manner than before.

At present, there exist two major modulation systems for terrestrial digital broadcasting: the orthogonal frequency division multiplexing (OFDM) system using numerous orthogonal carriers, and the single carrier system employing one carrier.

Typical terrestrial digital broadcasting standards that adopt the OFDM system include DVB-T (Digital Video Broadcasting-Terrestrial) and ISDB-T (Integrated Services Digital Broadcasting-Terrestrial).

The terrestrial digital broadcasting standards adopting the single carrier system may include ATSC (Advanced Television Systems Committee), DTMB (Digital Terrestrial Multimedia Broadcast), and DVB-C (Digital Video Broadcasting-Cable), for example.

In such setups of terrestrial digital broadcasting whereby received broadcast waves (received signal) are spectrally inverted for example, receiving apparatus may need to perform spectrum inversion for correct decoding.

Generally, transmitting apparatus transmits a signal by spectrally inverting either the upper or the lower frequency band in the frequency spectrum of the signal while leaving the other frequency band spectrally uninverted. Unless the spectrally inverted signal is perfectly symmetrical with the spectrally uninverted signal, the spectrally inverted signal generally needs to be spectrally inverted on the receiving side for correct decoding.

There are cases, however, that do not specify whether the transmitting side should perform spectrum inversion. For example, where different transmitting apparatuses spectrally invert different bands in the frequency spectrum upon transmission, the receiving apparatus may need to detect whether the received signal has been spectrally inverted. That is, if the received signal is found spectrally inverted, the receiving apparatus may spectrally invert the received signal; if the received is found spectrally uninverted, the receiving apparatus may not spectrally invert the received signal.

With the single carrier system, however, it may be difficult for the demodulation portion of the receiving apparatus to detect whether the received signal is spectrally inverted. In that case, if the transmitted signal (I, Q) is spectrally inverted, the received signal may be demodulated into (I, -Q) or (Q, I) when output on the receiving side before the signal is handed over to the error correction portion of the receiving apparatus. This can result in an erroneous decoding process.

There have been proposed methods for detecting the presence or absence of spectrum inversion and correcting the detected inversion (e.g., see Japanese Patent Laid-Open No. 2009-182552; called Patent Document 1 hereunder). The technique described in Patent Document 1 uses convolution code as error correcting code.

SUMMARY

However, the technique described Patent Document 1 may not be applicable to DTMB setups in which the LDPC (Low Density Parity Check) code is adopted as the error correcting code. Since there are a plurality of error correcting systems, the need exists for a method for detecting and correcting spectrum inversion in a manner applicable to (i.e., usable with) the largest possible number of error correcting methods.

The present disclosure has been made in view of the above circumstances and provides a signal processing apparatus, a signal processing method, and a program for detecting and correcting spectrum inversion in a more generalized manner than before.

According to one embodiment of the present disclosure, there is provided a signal processing apparatus including: a detection section configured such that based on a result of the error correction of a signal generated by a single carrier system, the detection section detects the presence or absence of spectrum inversion in the signal; and a selection section configured such that if the detection section detects the spectrum inversion, the selection section selects the spectrally inverted signal as the signal subject to the error correction, and that if the detection section does not detect the spectrum inversion, then the selection section selects the spectrally uninverted signal as the signal subject to the error correction.

Preferably, if the number of code words not successfully corrected through the error correction is not smaller than a predetermined threshold value with regard to a predetermined number of code words having undergone the error correction, then the detection section may cause the selection section to change the selected signals.

Preferably, if the number of code words not successfully corrected through the error correction is not smaller than a predetermined threshold value, then the detection section may cause the selection section to change the selected signals.

Preferably, if the number of code words corrected successfully through the error correction is not smaller than a predetermined threshold value, then the detection section may cause the selection section not to change the selected signals until the number of the code words not successfully corrected through the error correction is not smaller than a predetermined threshold value more than once.

Preferably, the signal processing apparatus of the present disclosure may further include a spectrum inversion section configured to spectrally invert the signal; wherein, based on a result of the detection of the spectrum inversion by the detection section, the selection section may select either the signal or the signal spectrally inverted by the spectrum inversion section as the signal subject to the error correction.

Preferably, the signal processing apparatus of the present disclosure may further include an equalization section configured to perform an equalization process on the signal selected by the selection section as the signal subject to the error correction.

Preferably, the signal processing apparatus of the present disclosure may further include an equalization section configured to perform an equalization process on the signal; wherein, if the detection section detects the spectrum inversion, then the selection section may select the signal equalized by the equalization section before being spectrally inverted as the signal subject to the error correction; and, if the detection section does not detect the spectrum inversion, then the selection section may select the spectrally uninverted signal equalized by the equalization section as the signal subject to the error correction.

Preferably, the signal processing apparatus of the present disclosure may further include a time deinterleave section configured to perform time deinterleave on the signal equalized by the equalization section; wherein, if the detection section detects the spectrum inversion, then the selection section may select the signal time-deinterleaved by the time deinterleave section before being spectrally inverted as the signal subject to the error correction; and, if the detection section does not detect the spectrum inversion, then the selection section may select the spectrally uninverted signal time-deinterleaved by the time deinterleave section as the signal subject to the error correction.

Preferably, the signal processing apparatus of the present disclosure may further include: a demapping section configured to perform a demapping process on the signal equalized by the equalization section; and an NR decoding section configured to perform NR decoding on the signal demapped by the demapping section; wherein the time deinterleave section may perform the time deinterleave on the signal NR-decoded by the NR decoding section.

According to another embodiment of the present disclosure, there is provided a signal processing method for use with a signal processing apparatus including a detection section and a selection section, the signal processing method including: based on a result of the error correction of a signal generated by a single carrier system, causing the detection section to detect the presence or absence of spectrum inversion in the signal; if the detection section detects the spectrum inversion, then causing the selection section to select the spectrally inverted signal as the signal subject to the error correction; and if the detection section does not detect the spectrum inversion, then causing the selection section to select the spectrally uninverted signal as the signal subject to the error correction.

According to a further embodiment of the present disclosure, there is provided a program for causing a computer to function as a detection section and a selection section, the program including: based on a result of the error correction of a signal generated by a single carrier system, causing the detection section to detect the presence or absence of spectrum inversion in the signal; if the detection section detects the spectrum inversion, then causing the selection section to select the spectrally inverted signal as the signal subject to the error correction; and if the detection section does not detect the spectrum inversion, then causing the selection section to select the spectrally uninverted signal as the signal subject to the error correction.

Where the present disclosure is embodied as outlined above, the presence or absence of spectrum inversion in the signal is detected based on the result of the error correction of the signal generated by the single carrier system. If spectrum inversion is detected, the spectrally inverted signal is selected as the signal subject to error correction. If spectrum inversion is not detected, then the spectrally uninverted signal is selected as the signal subject to error correction.

According to an embodiment of the present disclosure outlined above, signals can be suitably processed. In particular, the disclosure makes it possible to detect and correct spectrum inversion in a more generalized manner than before.

BRIEF DESCRIPTION OF THE DRAWINGS

FIG. 4 is a block diagram showing an example of a major structure of the receiving apparatus to which the present disclosure is applied;

FIG. 23 is a block diagram showing an example of a major structure of a personal computer to which the present disclosure is applied.

DETAILED DESCRIPTION OF THE PREFERRED EMBODIMENTS

Some preferred embodiments of the present disclosure (simply called the embodiment or embodiments hereunder) will now be described. The description will be given under the following headings:

1. First embodiment (receiving apparatus);
2. Second embodiment (receiving apparatus);
3. Third embodiment (spectrum inversion detection portion);
4. Fourth embodiment (receiving apparatus);
5. Fifth embodiment (receiving apparatus);
6. Sixth embodiment (error correction portion);
7. Seventh embodiment (receiving apparatus); and
8. Eighth embodiment (personal computer).

1. First Embodiment

Receiving Apparatus

Figure 1:
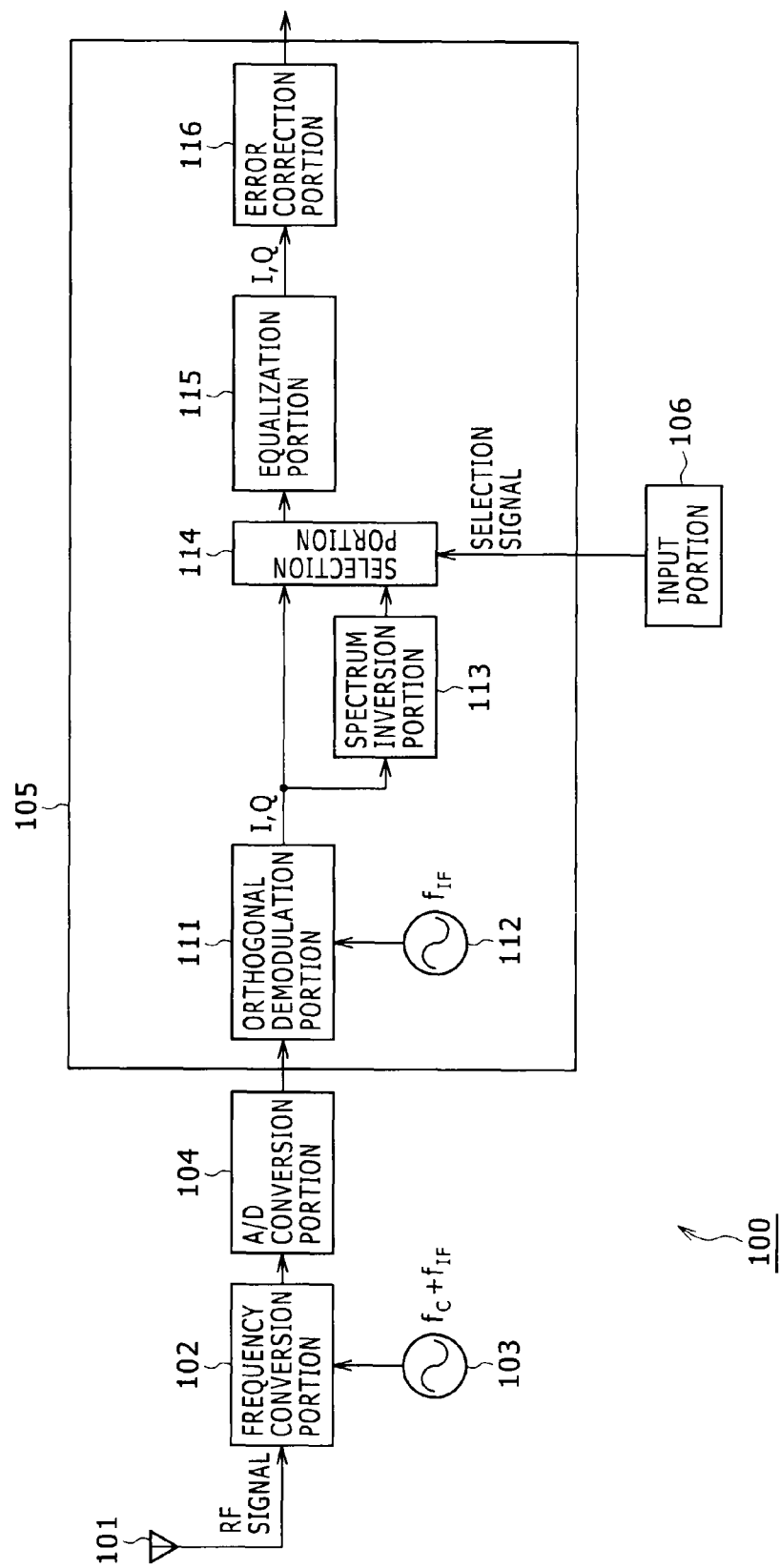
FIG. 1 is a block diagram showing an example of a major structure of receiving apparatus.

FIG. 1 is a block diagram showing an example of a major structure of receiving apparatus. The receiving apparatus 100 shown in FIG. 1 receives signals transmitted from transmitting apparatus, not shown. For example, the receiving apparatus 100 may be a TV set that receives the broadcast waves of a terrestrial digital broadcast transmitted from a broadcasting station.

As shown in FIG. 1, the receiving apparatus 100 is made up of an antenna 101, a frequency conversion portion 102, a local oscillation portion 103, an A/D conversion portion 104, a demodulation portion 105, and an input portion 106.

The receiving apparatus 100 receives via the antenna 101 an RF signal of a transmitted signal (e.g., broadcast waves of a terrestrial digital broadcast) from a suitable transmitting apparatus. The RF signal received via the antenna 101 is fed to the frequency conversion portion 102. The frequency conversion portion 102 frequency-converts the RF signal into an IF signal having a center frequency $f_{IF}$ by multiplying the RF signal by a carrier having an oscillation frequency $f_C+f_{IF}$ generated by the local oscillation portion 103.

The frequency conversion portion 102 supplies the IF signal thus obtained to the A/D conversion portion 104.

The A/D conversion portion 104 converts the IF signal fed from the frequency conversion portion 102 from analog to digital format. The A/D conversion portion 104 feeds the digitized IF signal to the demodulation portion 105.

The demodulation portion 105 demodulates the supplied IF signal.

As shown in FIG. 1, the demodulation portion 105 includes an orthogonal demodulation portion 111, a local oscillation portion 112, a spectrum inversion portion 113, a selection portion 114, an equalization portion 115, and an error correction portion 116.

The orthogonal demodulation portion 111 demodulates orthogonally the digitized IF signal fed from the A/D conversion portion 104 through the use of the oscillation frequency $f_{IF}$ generated by the local oscillation portion 112. The orthogonal demodulation portion 111 supplies the I and Q signals obtained through orthogonal demodulation to the spectrum inversion portion 113 and selection portion 114.

The spectrum inversion portion 113 performs a spectrum inversion process. For example, whereas any suitable method for spectrum inversion may be adopted, one known spectrum inversion process involves switching the I and Q signals in their positions. Another known spectrum inversion process involves multiplying the Q signal by "−1." The spectrum inversion portion 113 feeds the spectrally inverted signal to the selection portion 114.

The input portion 106 is generally composed of a keyboard, a mouse, buttons, a touch panel, and/or any other suitable input device connected through an external input terminal. From a user, another apparatus, or some other entity outside the receiving apparatus 100, the input portion 106 receives an instruction to select either the spectrally inverted signal or the spectrally uninverted signal. The input portion 106 supplies the selection portion 114 in the demodulation portion 105 with a selection signal based on the selection instruction thus received.

In accordance with the selection signal fed from the input portion 106, i.e., in keeping with the instruction from outside the receiving apparatus 100, the selection portion 114 accordingly selects either the spectrally uninverted signal coming from the orthogonal demodulation portion 111 or the spectrally inverted signal fed from the spectrum inversion portion 113, and sends the selected signal to the equalization portion 115.

The equalization portion 115 performs an equalization process on the signal supplied from the selection portion 114, and forwards the result of the process to the error correction portion 116. The error correction portion 116 performs error correction on the equalized signal sent from the equalization portion 115. If the transmitting apparatus has performed a mapping process for example, then the error correction portion 116 performs a demapping process on the equalized signal fed from the equalization portion 115.

In order for the demodulation portion 105 to demodulate the received signal correctly, the selection portion 114 should preferably select the spectrally uninverted signal fed from the orthogonal demodulation portion 111 if the received signal has not been spectrally inverted. If the received signal has been spectrally inverted, then the selection portion 114 should preferably select the spectrally inverted signal supplied from the spectrum inversion portion 113.

That is, in the above-described setup, the selection of the selection signal should preferably reflect whether or not the received signal has been spectrally inverted. Specifically, it is generally necessary to determine correctly whether or not the user or another apparatus has performed spectrum inversion on the transmitting apparatus (not shown).

Suppose that the transmitting apparatus has not performed spectrum inversion on the transmitted signal and that the selection portion 114 selects the output of the spectrum inversion portion 113. If that is the case, then the transmitted signal (I, Q) is turned into (I, −Q) or (Q, I) before being output to the error correction portion 116. This can result in an erroneous error correction process.

Where it is determined correctly whether or not the user or another apparatus has performed spectrum inversion on the transmitting apparatus (not shown) and where a suitable selection instruction is given accordingly, the selection portion 114 can properly select the signal in a manner reflecting the presence or absence of spectrum inversion in the received signal. This allows the error correction portion 116 to perform error correction properly.

[Flow of the Reception Process]

Figure 2:
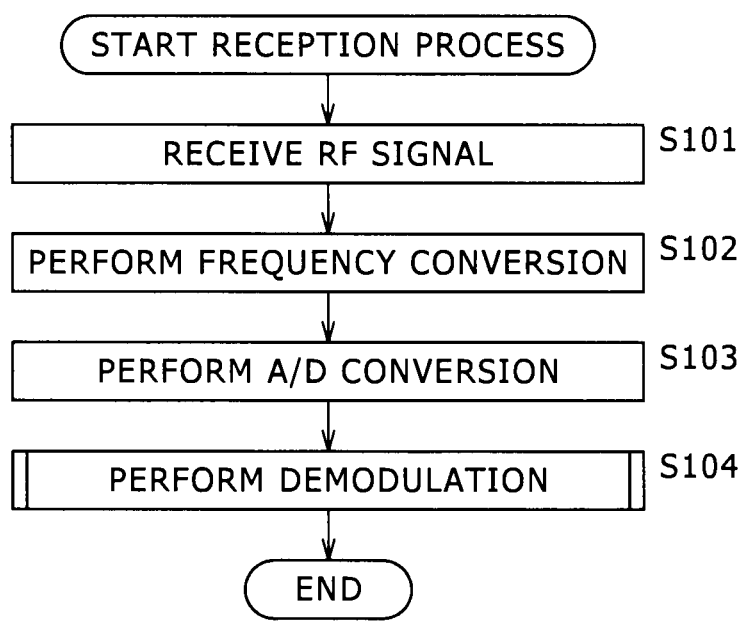
FIG. 2 is a flowchart explanatory of a typical flow of a reception process.

What follows are explanations of typical flows of various processes performed by the receiving apparatus 100 shown in FIG. 1. Explained first in reference to the flowchart of FIG. 2 is a typical flow of the reception process carried out by the receiving apparatus 100.

When the reception process is started, the frequency conversion portion 102 of the receiving apparatus 100 receives an RF signal via the antenna 101 in step S101. In step S102, the frequency conversion portion 102 frequency-converts the RF signal into an IF signal having a center frequency $f_{IF}$ by multiplying the RF signal by a carrier having an oscillation frequency $f_C+f_{IF}$ generated by the local oscillation portion 103.

In step S103, the A/D conversion portion 104 converts from analog to digital format the IF signal frequency-converted in step S102. In step S104, the demodulation portion 105 demodulates the IF signal digitized in step S103. Upon completion of the demodulation process, the receiving apparatus 100 terminates the reception process.

The above-described reception process is repeated at intervals of a predetermined data unit.

[Flow of the Demodulation Process]

Figure 3:
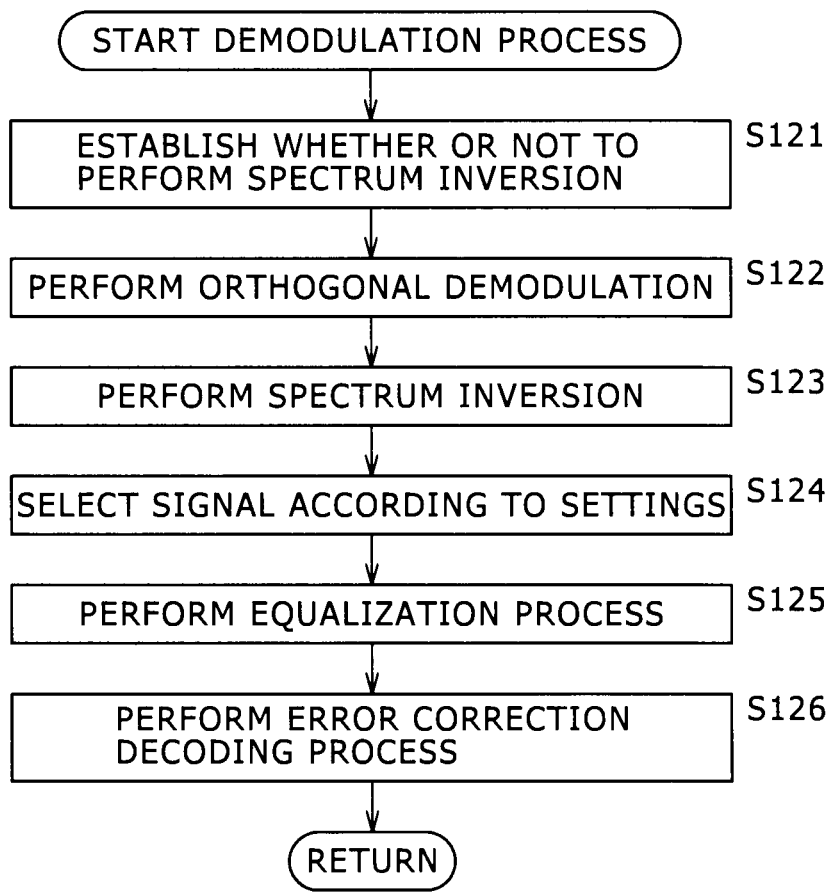
FIG. 3 is a flowchart explanatory of a typical flow of a demodulation process.

Explained below in reference to the flowchart of FIG. 3 is a detailed typical flow of the demodulation process carried out in step S104 of FIG. 2.

When the demodulation process is started, the input portion 106 establishes in step S121 whether or not to perform spectrum inversion on the received signal in accordance with the instruction from the user, another apparatus or the like.

In step S122, the orthogonal demodulation portion 111 orthogonally demodulates the digitized IF signal using the oscillation frequency $f_{IF}$ generated by the local oscillation portion 112. In step S123, the spectrum inversion portion 113 performs spectrum inversion on the I and Q signals obtained through orthogonal demodulation.

In step S124, in accordance with the settings made in step S121, the selection portion 114 selects either the signal spectrally inverted in step S123 or the signal yet to be spectrally inverted in step S123.

In step S125, the equalization portion 115 performs an equalization process on the signal selected in step S124. In step S126, the error correction portion 116 performs an error correction decoding process on the signal equalized in step S125.

Upon completion of the process in step S126, the demodulation portion 105 returns control to step S104 in FIG. 2 and terminates the reception process.

Where various processes are carried out as explained above, if the selection instruction input via the input portion 106 is correct, then the receiving apparatus 100 can correctly detect and correct spectrum inversion regardless of the error correction system in use. That is, the receiving apparatus 100 can detect and correct spectrum inversion in a more generalized manner than before.

2. Second Embodiment

Receiving Apparatus

FIG. 4 is a block diagram showing an example of a major structure of the receiving apparatus. The receiving apparatus 200 shown in FIG. 4 is an apparatus that receives signals transmitted from transmitting apparatus, not shown. For example, the receiving apparatus 200 may be a TV set that receives the broadcast waves of a terrestrial digital broadcast transmitted from a broadcasting station.

The receiving apparatus 200 is basically the same in structure as the receiving apparatus 100 shown in FIG. 1 and performs basically the same processes carried out by the apparatus 100 in FIG. 1. It should be noted, however, that the receiving apparatus 200 possesses a demodulation portion 205 and an input portion 206 in place of the demodulation portion 105 and input portion 106 of the receiving apparatus 100. Whereas the receiving apparatus 100 was shown to correct spectrum inversion in accordance with the selection instruction from the outside, the receiving apparatus 200 causes the demodulation portion 205 to detect the presence or absence of spectrum inversion in the received signal and to perform correction as needed.

The demodulation portion 205 is basically the same in structure as the demodulation portion 105 and performs basically the same process carried out by the demodulation portion 105. It should be noted, however, that the demodulation portion 205 is supplemented with a spectrum inversion detection portion 211 in addition to the components of the demodulation portion 105.

The input portion 206 is basically the same in structure as the input portion 106 and performs basically the same process carried out by the input portion 106. It should be noted, however, that the input portion 206 receives the settings destined for the spectrum inversion detection portion 211 and input from the user, another apparatus or the like, and supplies the spectrum inversion detection portion 211 with the instructions reflecting the settings. Details of the settings will be discussed later.

The spectrum inversion detection portion 211 acquires information about the result of error correction from the error correction portion 116. Based on the acquired information and on the settings fed from the input portion 206, the spectrum inversion detection portion 211 detects the presence or absence of spectrum inversion in the received signal and sends the result of the detection to the selection portion 114.

In accordance with the result of detecting the presence or absence of spectrum inversion in the received signal sent from the spectrum inversion detection portion 211, the selection portion 114 selects either the spectrally uninverted signal fed from the orthogonal demodulation portion 111 or the spectrally inverted signal coming from the spectrum inversion portion 113. The selection portion 114 supplies the selected signal to the equalization portion 115.

[Spectrum Inversion Detection Portion]

Figure 5:
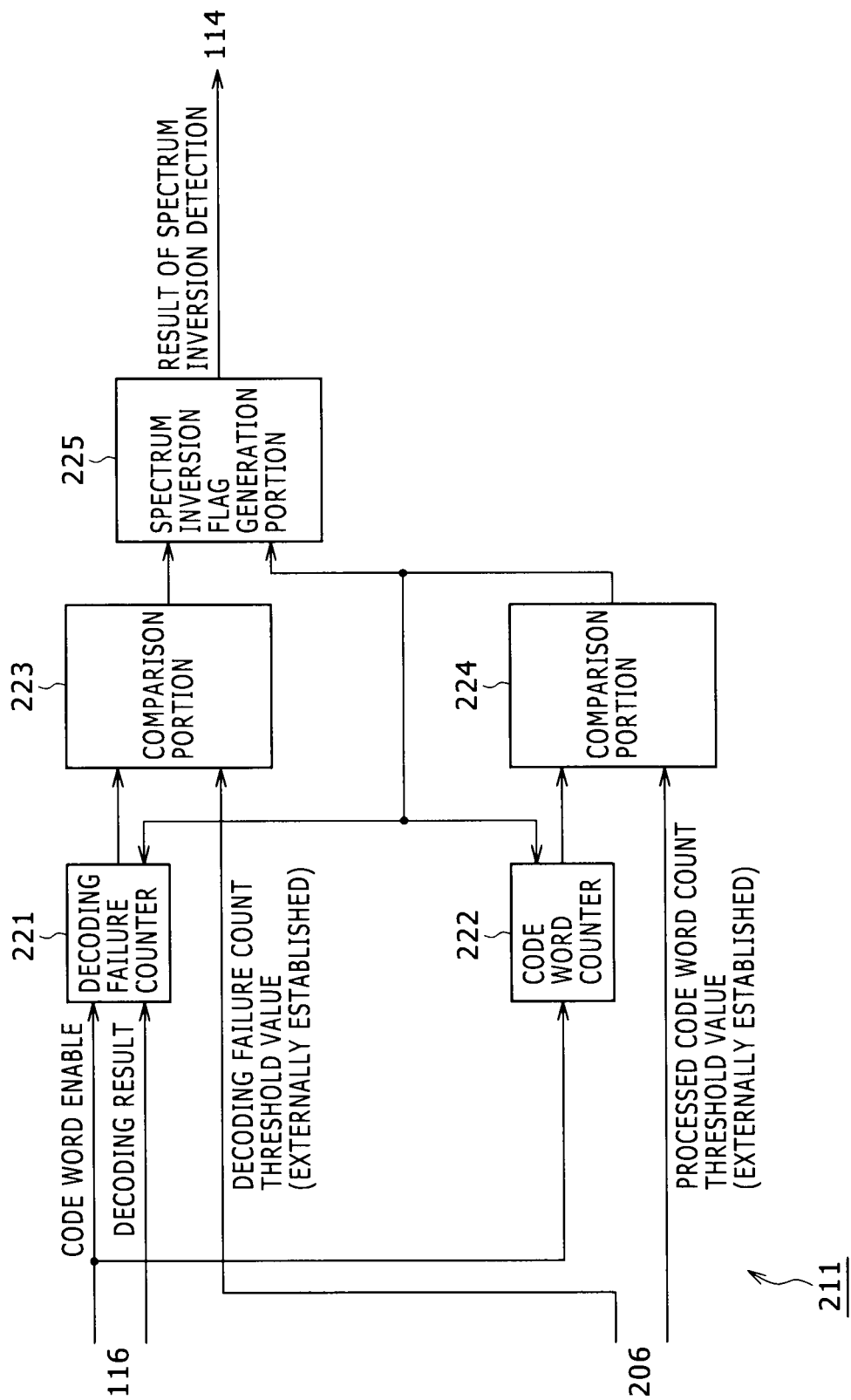
FIG. 5 is a block diagram showing an example of a major structure of a spectrum inversion detection portion.

FIG. 5 is a block diagram showing an example of a major structure of the spectrum inversion detection portion 211 shown in FIG. 4.

As shown in FIG. 5, the spectrum inversion detection portion 211 includes a decoding failure counter 221, a code word counter 222, comparison portions 223 and 224, and a spectrum inversion flag generation portion 225.

The decoding failure counter 221 acquires from the error correction portion 116 a code word enable signal indicating the start of a code word and a result of decoding (i.e., a flag indicative of a decoding success or failure). Using the enable signal and decoding result, the decoding failure counter 221 counts the number of the code words of which the decoding has failed. That is, the decoding failure counter 221 verifies the decoding result with regard to each code word indicated by the code word enable signal and counts the number of the code words if their decoding has failed. The decoding failure counter 221 retains the result of the counting and notifies the comparison portion 223 thereof as well.

If the output of the comparison portion 224 becomes "H," i.e., if the number of the code words having undergone error correction has reached an externally established threshold value of the number of counted code words, then the decoding failure counter 221 has its count value reset.

The code word counter 222 acquires from the error correction portion 116 a code word enable signal indicating the start of a code word and counts the number of code words based on the code word enable signal. The code word counter 222 retains the result of the counting and notifies the comparison portion 224 thereof as well.

If the output of the comparison portion 224 becomes "H," i.e., if the number of the code words having undergone error correction has reached an externally established threshold value of the number of counted code words, then the code word counter 222 has its count value reset.

The comparison portion 223 acquires a decoding failure count threshold value established externally by the user, another apparatus or the like. The comparison portion 223 compares the count value sent from the decoding failure counter 221, i.e., the number of the code words of which the decoding has failed, with the decoding failure count threshold value. If the number of the code words of which the decoding has failed is smaller than the decoding failure count threshold value (i.e., previously determined threshold value), the comparison portion 223 outputs an "L" flag; if the number of the code words of which the decoding has failed becomes equal to or larger than the decoding failure count threshold value, then the comparison portion 223 outputs an "H" flag.

The flag output from the comparison portion 223 is sent to the spectrum inversion flag generation portion 225.

The comparison portion 224 acquires a threshold value of the number of code words constituting a count unit for counting the number of the code words of which the decoding has failed (i.e., processed code word count threshold value), the threshold value being received via the input portion 206 and established externally by the user, another apparatus or the like. That is, the number of the code words of which the decoding has failed is counted at intervals of the processed code word count threshold value (i.e., the number of decoding failures is counted per processed code word count threshold value).

The comparison portion 224 compares the count value sent from the code word counter 222, i.e., the number of code words having undergone error correction, with the processed code word count threshold value. If the number of code words having undergone error correction is smaller than the processed code word count threshold value (i.e., previously determined threshold value), the comparison portion 224 outputs an "L" flag. If the number of code words having undergone error correction is equal to or larger than the processed code word count threshold value, then the comparison portion 224 outputs an "H" flag.

The flag output from the comparison portion 224 is sent to the spectrum inversion flag generation portion 225. Also, the flag output from the comparison portion 224 is supplied to the decoding failure counter 221 and code word counter 222. The two counters have their count values reset using the supplied flag.

When the value of the flag output from the comparison portion 224 becomes "H," the spectrum inversion flag generation portion 225 verifies the value of the flag output from the comparison portion 223. If the value of the flag from the comparison portion 223 is "H" where spectrum inversion is not supposed to exist in the received signal (i.e., when the selection portion 114 is selecting the output of the orthogonal demodulation portion 111), then the spectrum inversion flag generation portion 225 determines that spectrum inversion exists. If the value of the flag from the comparison portion 223 is "L" where spectrum inversion is not supposed to exist in the received signal, the spectrum inversion flag generation portion 225 determines that there is no spectrum inversion.

That is, where spectrum inversion is not supposed to exist in the received signal, if the code words of which the decoding has failed are detected equal to or in excess of the decoding failure count threshold value out of the number of coded words given by the processed code word count threshold value, then the spectrum inversion flag generation portion 225 determines that spectrum inversion exists; otherwise the spectrum inversion flag generation portion 225 determines that spectrum inversion does not exist.

Where spectrum inversion is supposed to exist in the received signal (i.e., when the selection portion 114 is selecting the output of the spectrum inversion portion 113), the spectrum inversion flag generation portion 225 determines that there is no spectrum inversion if the value of the flag output from the comparison portion 223 is "H," and determines that spectrum inversion exists if the value of the flag is "L."

In other words, where spectrum inversion is supposed to exist in the received signal, the spectrum inversion flag generation portion 225 determines that there is no spectrum inversion if the code words of which the decoding has failed are detected equal to or in excess of the decoding failure count threshold value out of the number of coded words given by the processed code word count threshold value; otherwise the spectrum inversion flag generation portion 225 determines that spectrum inversion exists.

The spectrum inversion flag generation portion 225 supplies the selection portion 114 with the result of determining the presence or absence of spectrum inversion as the result of spectrum inversion detection. If the spectrum inversion flag generation portion 225 determines that there is no spectrum inversion, the selection portion 114 selects the output of the orthogonal demodulation portion 111. If the spectrum inversion flag generation portion 225 determines that spectrum inversion exists, then the selection portion 114 selects the output of the spectrum inversion portion 113. The selection portion 114 feeds the selected output to the equalization portion 115.

In the manner described above, the spectrum inversion detection portion 211 can correctly detect the presence or absence of spectrum inversion in accordance with the result of the error detection regardless of the error correction system in use. This allows the selection portion 114 to select the signal in a manner correctly reflecting the presence or absence of spectrum inversion in the received signal, whereby the error correction portion 116 can perform error correction properly.

That is, the receiving apparatus 200 can detect and correct spectrum inversion in a more generalized manner than before.

[Flow of the Demodulation Process]

What follows are explanations of typical flows of various processes performed by the receiving apparatus 200. The flow of the reception process carried out by the receiving apparatus 200 is typically the same as that performed by the receiving apparatus 100 explained above in reference to the flowchart of FIG. 2. Thus the reception process will not be discussed further.

Figure 6:
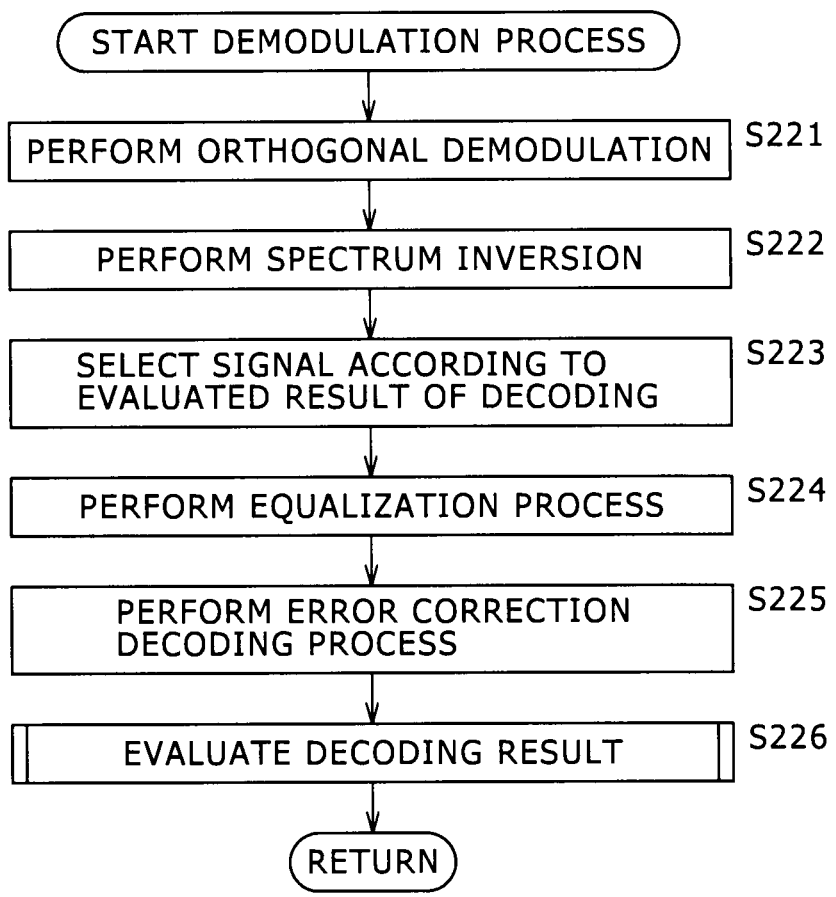
FIG. 6 is a flowchart explanatory of another typical flow of the demodulation process.

Explained below in reference to the flowchart of FIG. 6 is a typical flow of the demodulation process carried out in step S104 of the reception process performed by the receiving apparatus 200.

When the demodulation process is started, the orthogonal demodulation portion 111 in step S221 performs orthogonal demodulation of the digitized IF signal using the oscillation frequency $f_{IF}$ generated by the local oscillation portion 112. In step S222, the spectrum inversion portion 113 performs spectrum inversion of the I and Q signals obtained through orthogonal demodulation.

In step S223, in accordance with the evaluated result of the decoding carried out in step S226 of the preceding demodulation process, the selection portion 114 selects either the signal spectrally inverted in step S123 or the signal yet to be spectrally inverted in step S123.

The demodulation process is repeated at intervals of a predetermined data unit (for example, a data unit larger than the processed code word count threshold value, i.e., the number of code words in units of which the number of decoding failures is counted) while the receiving apparatus 200 receives the signal.

In step S224, the equalization portion 115 performs an equalization process on the signal selected in step S223. In step S225, the error correction portion 116 performs an error correction decoding process on the signal equalized in step S224.

In step S226, the spectrum inversion detection portion 211 evaluates the result of the error correction decoding process carried out in step S225 so as to detect the presence or absence of spectrum inversion in the received signal.

Upon completion of the process of step S226, the demodulation portion 105 returns control to step S104 of FIG. 2 and terminates the reception process.

[Decoding Result Evaluation Process]

Figure 7:
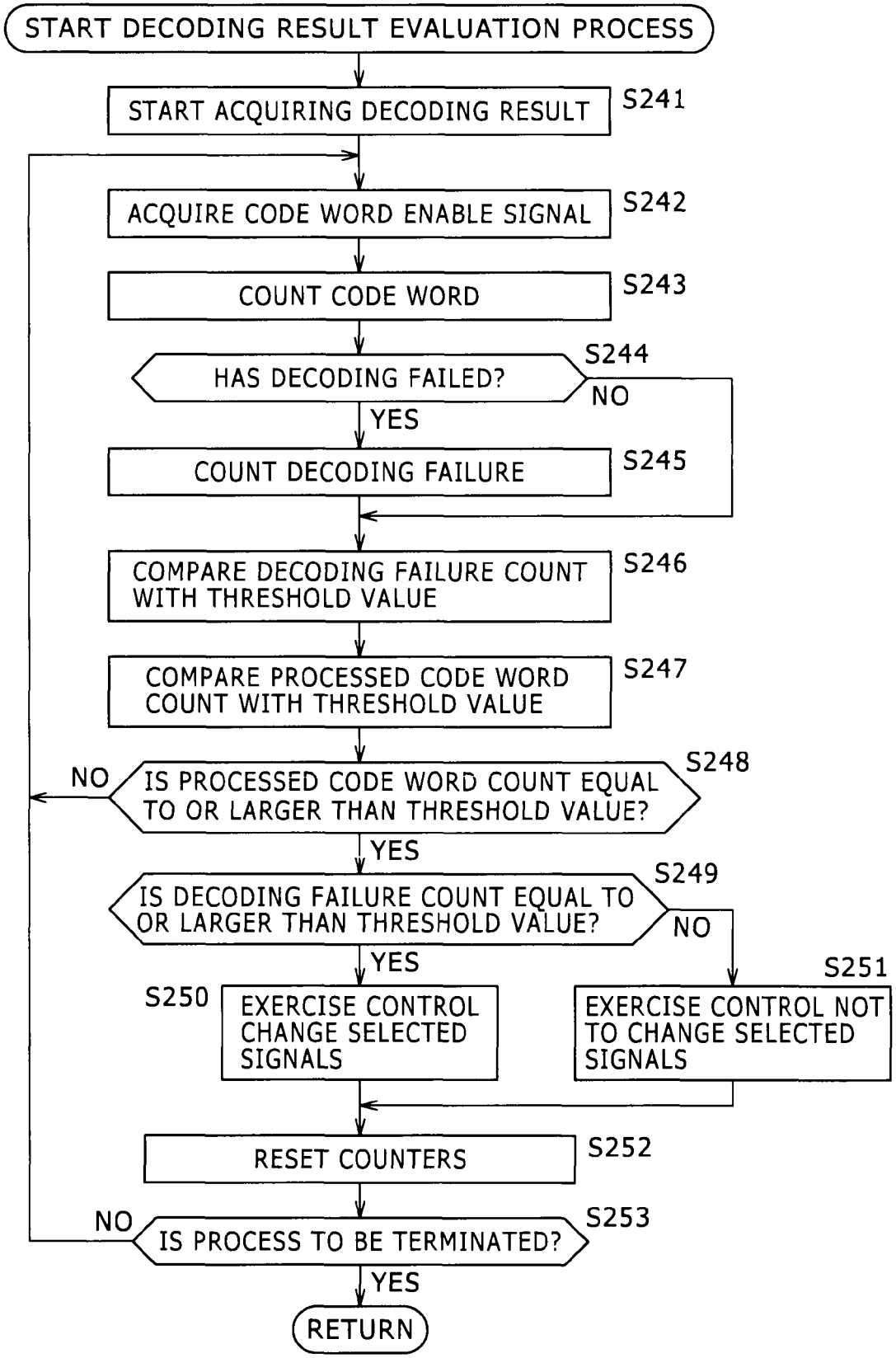
FIG. 7 is a flowchart explanatory of a typical flow of a decoding result evaluation process.

Explained below in reference to the flowchart of FIG. 7 is a typical flow of the decoding result evaluation process performed in step S226 of FIG. 6.

When the decoding result evaluation process is started, the decoding failure counter 221 of the spectrum inversion detection portion 211 in step S241 starts acquiring the result of the decoding. In step S242, the decoding failure counter 221 and code word counter 222 acquire a code word enable signal. After acquiring the code word enable signal, the code word counter 222 in step S243 counts the code word.

In step S244, the decoding failure counter 221 having acquired the code word enable signal determines whether or not the error correction portion 116 has failed in decoding based on the value of the decoding result obtained at that point.

If it is determined that the error correction portion 116 has failed in the decoding, the decoding failure counter 221 in step S245 counts that decoding failure, and passes control to step S246. If in step S244 it is determined that the error correction portion 116 has succeeded in the decoding, the error failure counter 221 skips the process of step S245 and passes control to step S246.

In step S246, the comparison portion 223 compares the number of decoding failures, i.e., the count value obtained in step S245, with a predetermined decoding failure count threshold value. In step S247, the comparison portion 224 compares the number of processed code words, i.e., the count value obtained in step S243, with the predetermined processed code word count threshold value.

In step S248, based on the result of the comparison in step S247, the spectrum inversion flag generation portion 225 determines whether the number of processed code words is equal to or larger than the processed code word count threshold value. If it is determined that the number of processed code words is smaller than the processed code word count threshold value, then control is returned to step S242 and the subsequent steps are repeated.

If in step S248 it is determined that the number of processed code words is equal to or larger than the processed code word count threshold value, then the spectrum inversion flag generation portion 225 passes control to step S249.

In step S249, based on the result of the comparison in step S246, the spectrum inversion flag generation portion 225 determines whether the number of decoding failures is equal to or larger than the decoding failure count threshold value.

If it is determined that the number of decoding failures is equal to or larger than the decoding failure count threshold value, the spectrum inversion flag generation portion 225 passes control to step S250. In step S250, the spectrum inversion flag generation portion 225 controls the selection portion 114 to change the selected signals, before passing control to step S252. If in step S249 it is determined that the number of decoding failures is smaller than the decoding failure count threshold value, then the spectrum inversion flag generation portion 225 passes control to step S251 and controls the selection portion 114 not to change the selected signals, before passing control to step S252.

In step S252, the decoding failure counter 221 and code word counter 222 have their counter values reset.

In step S253, the spectrum inversion detection portion 211 determines whether or not to terminate the decoding result evaluation process. If the spectrum inversion detection portion 211 determines that the decoding result evaluation process is not to be terminated, then control is returned to step S242 and the subsequent steps are repeated.

If in step S253 it is determined that the decoding result evaluation process is to be terminated, then the spectrum inversion detection portion 211 terminates the decoding result evaluation process, returns control to step S226 of FIG. 6 to terminate the demodulation process, and then returns control to step S104 of FIG. 2 to terminate the reception process.

When the diverse processes are carried out as explained above, the receiving apparatus 200 can detect and correct spectrum inversion regardless of the error correction system in use. That is, the receiving apparatus 200 can detect and correct spectrum inversion in a more generalized manner than before.

3. Third Embodiment

Spectrum Inversion Detection Portion

The spectrum inversion detection portion 211 was explained above in conjunction with the second embodiment. It should be noted that the above-described method of spectrum inversion detection is an example and that spectrum inversion may be detected using any other suitable method.

Figure 8:
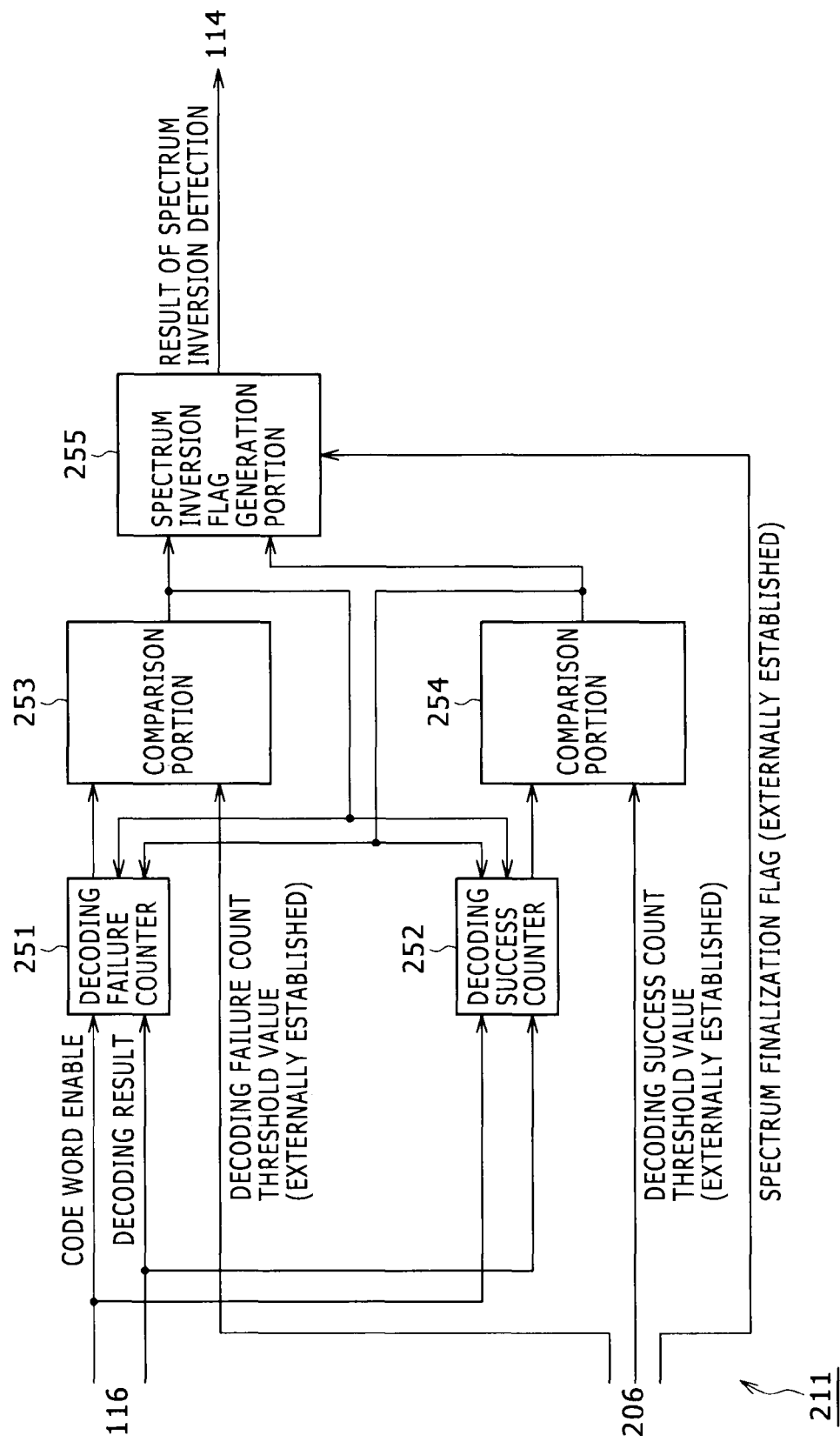
FIG. 8 is a block diagram showing another example of the major structure of the spectrum inversion detection portion.

FIG. 8 is a block diagram showing another example of the major structure of the spectrum inversion detection portion 211. As shown in FIG. 8, the spectrum inversion detection portion 211 of this example includes a decoding failure counter 251, a decoding success counter 252, comparison portions 253 and 254, and a spectrum inversion flag generation portion 255.

As with the decoding failure counter 221, the decoding failure counter 251 counts the number of the code words of which the decoding has failed. That is, like the decoding failure counter 211, the decoding failure counter 251 acquires from the error correction portion 116 a code word enable signal indicating the start of a code word and a decoding result (i.e., a flag indicating whether the decoding has succeeded or failed). Using the code word enable signal and the decoding result, the decoding failure counter 251 counts the number of the code words of which the decoding has failed, retains the result of the counting, and notifies the comparison portion 253 thereof as well.

The decoding failure counter 251 has its count value reset if the output of the comparator 253 or 254 is "H," i.e., if the number of the code words of which the error correction decoding has failed has reached an externally established decoding failure count threshold value, or if the number of the code words of which the error correction decoding has succeeded has reached an externally established decoding success count threshold value.

As opposed to the decoding failure counter 251, the decoding success counter 252 counts the number of the code words of which the decoding has succeeded. As with the decoding failure counter 251, the decoding success counter 252 acquires a code word enable signal indicating the start of a code word and a decoding result (i.e., a flag indicating whether the decoding has succeeded or failed). Using the code word enable signal and the decoding result, the decoding success counter 252 counts the number of the code words of which the decoding has succeeded. The decoding success counter 252 retains the result of the counting and notifies the comparison portion 254 thereof as well.

Like the decoding failure counter 251, the decoding success counter 252 has its count value reset if the output of the comparison portion 253 or 254 is "H," i.e., if the number of the code words of which the error correction decoding has failed has reached the externally established decoding failure count threshold value, or if the number of the code words of which the error correction decoding has succeeded has reached the externally established decoding success count threshold value.

As with the comparison portion 223, the comparison portion 253 compares the number of the code words of which the error correction decoding has failed, with the externally established decoding failure count threshold value. That is, the comparison portion 253 acquires the decoding failure count threshold value received via the input portion 206 and established externally by the user, another apparatus or the like, and compares the acquired threshold value with the count value sent from the decoding failure counter 251, i.e., with the number of the code words of which the decoding has failed. If the number of the code words of which the decoding has failed is smaller than the decoding failure count threshold value (i.e., predetermined threshold value), the comparison portion 253 outputs an "L" flag; if the number of the code words of which the decoding has failed is equal to or larger than the decoding failure count threshold value, then the comparison portion 253 outputs an "H" flag.

The flag output from the comparison portion 253 is fed to the spectrum inversion flag generation portion 255. Also, the flag output from the comparison portion 253 is supplied to the decoding failure counter 251 and decoding success counter 252. The decoding failure counter 251 and decoding success counter 252 have their count values reset using the supplied flag.

The comparison portion 254 compares the number of the code words of which the error correction decoding has succeeded with the externally established decoding success count threshold value. Specifically, the comparison portion 254 first acquires a threshold value for the number of the code words of which the decoding has succeeded (i.e., decoding success count threshold value), the threshold value being received via the input portion 206 and established externally by the user, another apparatus or the like. The comparison portion 254 then compares the count value sent from the decoding success counter 252, i.e., the number of the code words of which the decoding has succeeded, with the decoding success count threshold value. If the number of the code words of which the decoding has succeeded is smaller than the decoding success count threshold value (i.e., predetermined threshold value), the comparison portion 254 outputs an "L" flag; if the number of the code words of which the decoding has succeeded is equal to or larger than the decoding success count threshold value, then the comparison portion 254 outputs an "H" flag.

The flag output from the comparison portion 254 is fed to the spectrum inversion flag generation portion 255. Also, the flag output from the comparison portion 254 is supplied to the decoding failure counter 251 and decoding success counter 252. The decoding failure counter 251 and decoding success counter 252 have their count values reset using the supplied flag.

The spectrum inversion flag generation portion 255 detects the presence or absence of spectrum inversion in accordance with the output of the comparison portion 253, the output of the comparison portion 254, and the value of a spectrum finalization flag received via the input portion 206 and established externally by the user, another apparatus or the like. The spectrum inversion flag generation portion 255 supplies the result of the detection (i.e., spectrum inversion detection result) to the selection section 114 as a spectrum inversion flag.

The spectrum determination flag constitutes flag information for controlling whether or not to finalize the result of determining whether there exists spectrum inversion. For example, if the value of the spectrum finalization flag is "H," the result of determining the presence or absence of spectrum inversion is finalized. The value of the spectrum inversion flag is kept unchanged (i.e., fixed) even if the output of the comparison portion 253 or 254 is changed. That is, the value of the spectrum inversion flag is variable only if the value of the spectrum finalization flag is "L."

The selection portion 114 selects either the output of the orthogonal demodulation portion 111 or the output of the spectrum inversion portion 113 depending on the value of the spectrum inversion flag.

For example, if spectrum inversion has been detected, the spectrum inversion flag generation portion 255 supplies the selection portion 114 with the spectrum inversion flag having the value "H." Based on the supplied value, the selection portion 114 selects the output of the spectrum inversion portion 113 and feeds the selected output to the equalization portion 115.

As another example, if spectrum inversion has not been detected, the spectrum inversion flag generation portion 255 supplies the selection portion 114 with the spectrum inversion flag having the value "L." Based on the supplied value, the selection portion 114 selects the output of the orthogonal demodulation portion 111 and sends the selected output to the equalization portion 115.

[Spectrum Inversion Flag Generation Portion]

The spectrum inversion flag generation portion 255 makes transition to one of its three states in accordance with the output of the comparison portion 253, the output of the comparison portion 254, the value of the spectrum finalization flag, and current status. Depending on the state to which the transition was made, the spectrum inversion flag generation portion 255 determines the value of the spectrum inversion flag to be output.

Figure 9:
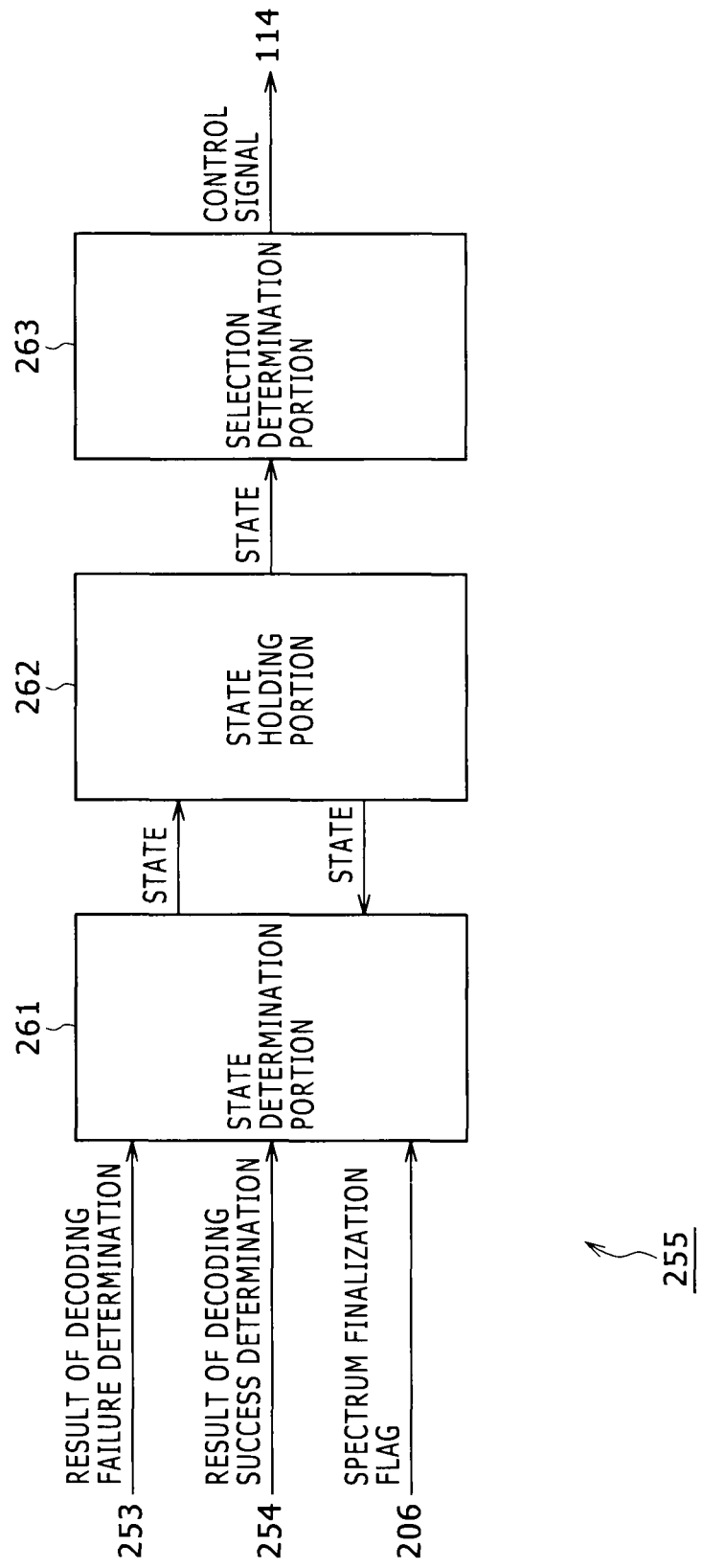
FIG. 9 is a block diagram showing an example of a major structure of a spectrum inversion flag generation portion.

FIG. 9 is a block diagram showing an example of a major structure of the spectrum inversion flag generation portion 255. As shown in FIG. 9, the spectrum inversion flag generation portion 255 includes a state determination portion 261, a state holding portion 262, and a selection determination portion 263.

The state determination portion 261 acquires a decoding failure determination result from the comparison portion 253 and a decoding success determination result from the comparison portion 254. Also, the state determination portion 261 acquires the spectrum finalization flag received via the input portion 206. Furthermore, the state determination portion 261 acquires the state of the spectrum inversion flag generation portion 255 held by the state holding portion 262.

Based on these acquired values, the state determination portion 261 determines the most recent state of the spectrum inversion flag generation portion 255. Having determined the latest state, the state determination portion 261 feeds the result of the determination to the state holding portion 262 and causes the state holding portion 262 to hold the result of the determination. Based on the state of the spectrum inversion flag generation portion 255 held by the state holding portion 262, the selection determination portion 263 detects the presence or absence of spectrum inversion and determines the selection to be made by the selection portion 114. The selection determination portion 263 supplies the selection portion 114 with the determined selection as control information (i.e., spectrum inversion flag).

[State Transitions]

Explained below are the state transitions made by the state determination portion 261 shown in FIG. 9. Three states S0, S1 and S2 are provided beforehand so that the spectrum inversion flag generation portion 255 can make the transition to any one of them.

The state S0 is a state where control is exercised with no spectrum inversion performed, i.e., a state in which the selection portion 114 is caused to select the output of the orthogonal demodulation portion 111 (the spectrum inversion flag generation portion 255 outputs the spectrum inversion flag having the value "L").

The state S1 is a state where control is exercised with spectrum inversion carried out, i.e., a state in which the selection portion 114 is caused to select the output of the spectrum inversion portion 113 (the spectrum inversion flag generation portion 255 outputs the spectrum inversion flag having the value "H").

The state S2 is a state where the same control is exercised as in the last time.

The state determination portion 261 causes the spectrum inversion flag generation portion 255 to make the transition to one of the three above-described states in accordance with input.

Figure 10:
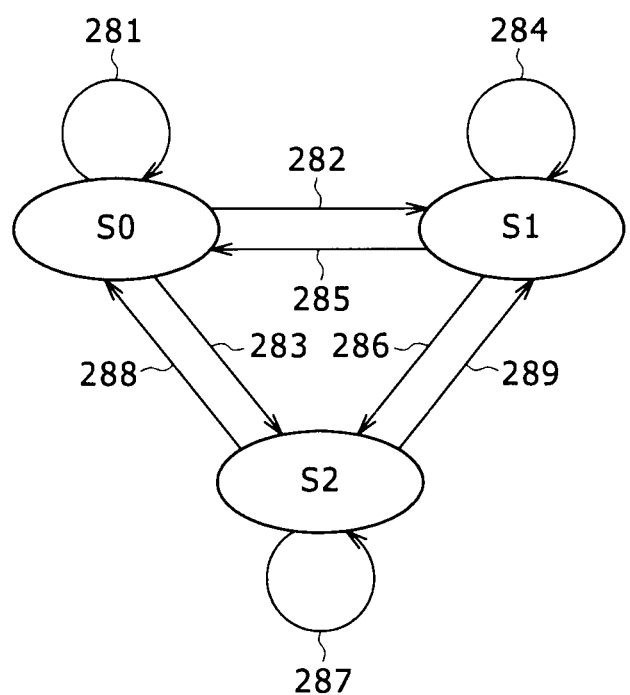
FIG. 10 is a state transition diagram showing typical state transitions.

FIG. 10 is a state transition diagram showing typical state transitions made by the spectrum inversion flag generation portion 255.

Under control of the state determination portion 261 for example, the spectrum inversion flag generation portion 255 makes state transitions as indicated by arrows in FIG. 10.

Explained first below is the case where the preceding state acquired from the state holding portion 262 is the state S0. For example, suppose that the result of decoding failure determination, the result of decoding success determination, and the value of the spectrum finalization flag are all "L."

In that case, the fact that the value of the spectrum finalization flag is "L" means that the value of the spectrum inversion flag is variable. However, since the decoding failure determination result and the decoding success determination result are both "L," neither the number of decoding failures nor the number of decoding successes has reached the corresponding threshold value. Thus it is not clear which is the larger of the two counts (i.e., whether the signal state is good or bad is unclear).

In such a case, the spectrum inversion flag generation portion 255 makes the state transition indicated by arrow 281. That is, the spectrum inversion flag generation portion 255 stays in the state S0.

As another example, suppose that the result of decoding failure determination is "H" and that the result of decoding success determination and the value of the spectrum finalization flag are both "L."

In that case, the fact that the spectrum finalization flag value is "L" means the value of the spectrum inversion flag is variable. With the decoding failure determination result given as "H," it is determined that the signal state is bad.

In this case, the spectrum inversion flag generation portion 255 makes the state transition indicated by arrow 282. That is, the spectrum inversion flag generation portion 255 makes the transition from the state S0 to the state S1.

As a further example, suppose that the result of decoding success determination is "H" and that the result of decoding failure determination and the value of the spectrum finalization flag are both "L."

In that case, the fact that the value of the spectrum finalization flag is "L" means the value of the spectrum inversion flag is variable. With the decoding success determination result given as "H," it is determined that the signal state is good.

In such a case, the spectrum inversion flag generation portion 255 makes the state transition indicated by arrow 283. That is, the spectrum inversion flag generation portion 255 makes the transition from the state S0 to the state S2.

Explained next is the case where the preceding state acquired from the state holding portion 262 is the state S1. For example, suppose that the result of decoding failure determination, the result of decoding success determination, and the value of the spectrum finalization flag are all "L."

In that case, the fact that the value of the spectrum finalization flag is "L" means the value of the spectrum inversion flag is variable. However, since the decoding failure determination result and the decoding success determination result are both "L," neither the number of decoding failures nor the number of decoding successes has reached the corresponding threshold value. Thus it is not clear which is the larger of the two counts (i.e., whether the signal state is good or bad is unclear).

In such a case, the spectrum inversion flag generation portion 255 makes the state transition indicated by arrow 284. That is, the spectrum inversion flag generation portion 255 stays in the state S1.

As another example, suppose that the result of decoding failure determination is "H" and that the result of decoding success determination and the value of the spectrum finalization flag are both "L."

In that case, the fact that the spectrum finalization flag value is "L" means the value of the spectrum inversion flag is variable. With the decoding failure determination result given as "H," it is determined that the signal state is bad.

In this case, the spectrum inversion flag generation portion 255 makes the state transition indicated by arrow 285. That is, the spectrum inversion flag generation portion 255 makes the transition from the state S1 to the state S0.

As a further example, suppose that the result of decoding success determination is "H" and that the result of decoding failure determination and the value of the spectrum finalization flag are both "L."

In that case, the fact that the value of the spectrum finalization flag is "L" means the value of the spectrum inversion flag is variable. With the decoding success determination result given as "H," it is determined that the signal state is good.

In such a case, the spectrum inversion flag generation portion 255 makes the state transition indicated by arrow 286. That is, the spectrum inversion flag generation portion 255 makes the transition from the state S1 to the state S2.

Explained next is the case where the preceding state acquired from the state holding portion 262 is the state S2. For example, suppose that the value of the spectrum finalization flag is "H." In this case, the value of the spectrum inversion flag is not variable (i.e., fixed), so that the spectrum inversion flag generation portion 255 makes the transition indicated by arrow 287. That is, the spectrum inversion flag generation portion 255 stays in the state S2.

As another example, suppose that the result of decoding failure determination and the value of the spectrum finalization flag are both "L." In this case, it is determined that the signal state is at least not worsening. Thus the spectrum inversion flag generation portion 255 makes the transition indicated by arrow 287. That is, the spectrum inversion flag generation portion 255 stays in the state S2.

As a further example, suppose that the result of decoding failure determination is "H" and that the value of the spectrum finalization flag is "L." In this case, the signal state is worsening, so that the spectrum inversion flag generation portion 255 makes the state transition indicated by arrow 288 or 289. That is, the spectrum inversion flag generation portion 255 makes the transition from the state S2 to the immediately preceding state (i.e., the state from which the last transition was made (S0 or S1)). For example, where the spectrum inversion flag generation portion 255 made the transition from the state S0 to the state S2, the spectrum inversion flag generation portion 255 now makes the transition to the state S0; where the spectrum inversion flag generation portion 255 made the transition from the state S1 to the state S2, the spectrum inversion flag generation portion 255 makes the transition to the state S1.

As explained above, the state determination portion 261 causes the spectrum inversion flag generation portion 255 to make state transitions and updates the state held by the state holding portion 262. The selection determination portion 263 determinates the selection to be made by the selection portion 114 in accordance with the most recent state held by the state holding portion 262.

That is, after the presence or absence of spectrum inversion is detected and the selection portion 114 is controlled accordingly, the decoding process may succeed more times than the decoding success count threshold value at least once. In that case, the spectrum inversion flag generation portion 255 will not cause the selection portion 114 to change the selected signals unless and until the decoding process fails more times than the decoding failure count threshold value at least twice.

Generally, if the presence or absence of spectrum inversion is not detected correctly, the number of error correction decoding failures grows continuously. However, it might happen that the number of error correction failures increases locally for unknown reasons other than spectrum inversion. As explained above, where not only the number of decoding failures but also the number of decoding successes is counted and where the three states are used for control purposes, it is possible to minimize the erroneous determination of whether or not spectrum inversion exists caused by such local increase of error correction.

In that case, the spectrum inversion detection portion 211 can correctly detect the presence or absence of spectrum inversion in accordance with the result of error correction regardless of the error correction system in use. This allows the selection portion 114 to select the signal properly in keeping with the presence or absence of spectrum inversion in the received signal, so that the error correction portion 116 can perform error correction appropriately.

That is, the receiving apparatus 200 can also detect and correct spectrum inversion in a more generalized manner than before in such cases.

Obviously, it is also possible to have only the number of decoding failures or the number of decoding successes counted.

[Flow of the Decoding Result Evaluation Process]

Figure 11:
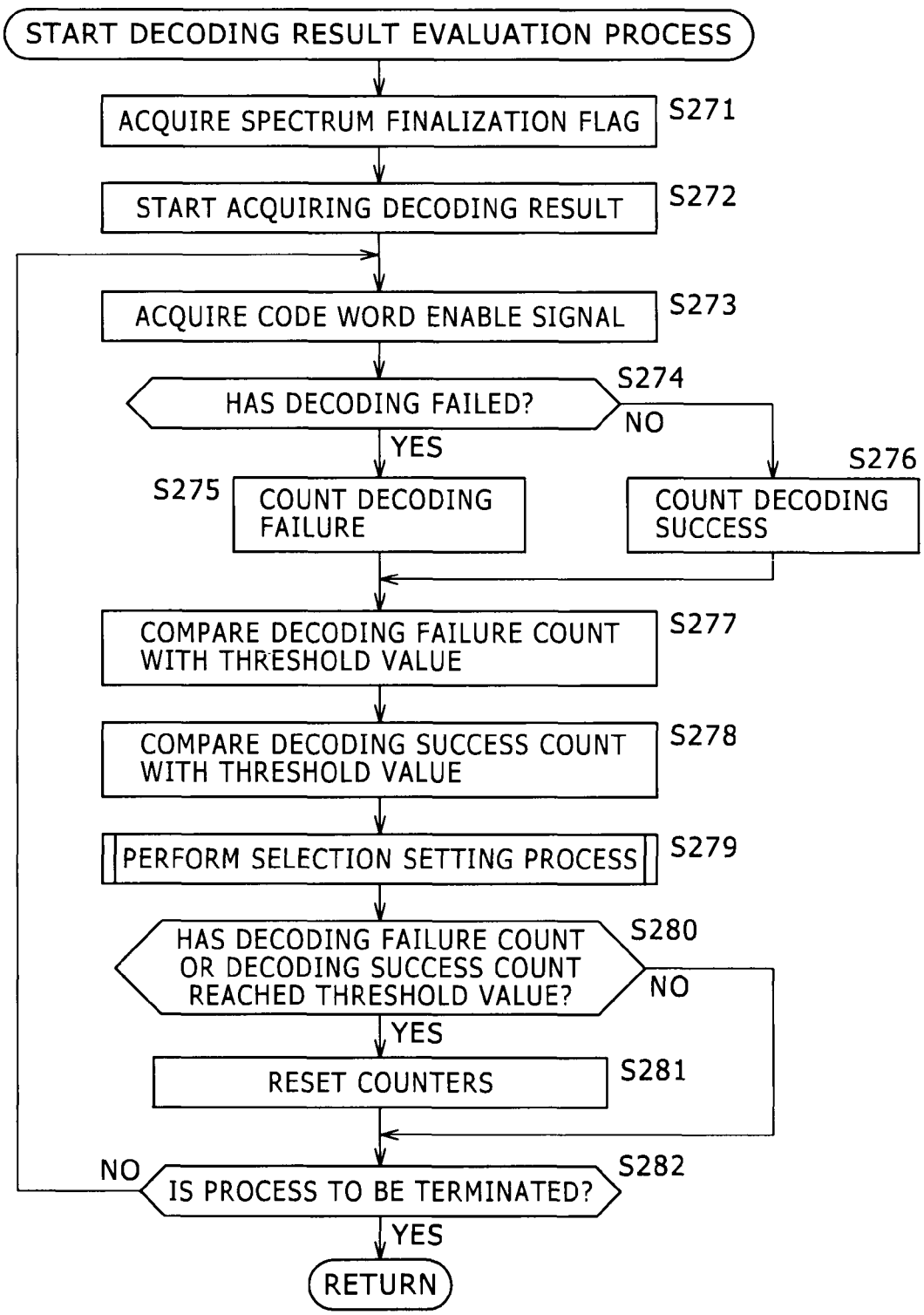
FIG. 11 is a flowchart explanatory of another typical flow of the decoding result evaluation process.

Explained below in reference to the flowchart of FIG. 11 is a typical flow of the decoding result evaluation process carried out where either the number of decoding failures or the number of decoding successes is counted.

When the decoding result evaluation process is started, the spectrum inversion flag generation portion 255 shown in FIG. 8 acquires in step S271 the spectrum finalization flag from the outside via the input portion 206. In step S272, the decoding failure counter 251 and decoding success counter 252 start acquiring the decoding result from the error correction portion 116.

In step S273, the decoding failure counter 251 and decoding success counter 252 acquire a code word enable signal from the error correction portion 116. After acquiring the code word enable signal, the decoding failure counter 251 and decoding success counter 252 determine in step S274 whether or not the decoding has failed. If it is determined that the decoding has failed, control is passed on to step S275. In step S275, the decoding failure counter 251 counts the decoding failure, before passing control to step S277.

If in step S274 it is determined that the decoding has succeeded, the decoding success counter 252 passes control to step S276. In step S276, the decoding success counter 252 counts the decoding success, before passing control to step S277.

In step S277, the comparison portion 253 compares the decoding failure count with the decoding failure count threshold value. In step S278, the comparison portion 254 compares the decoding success count with the decoding success count threshold value.

In step S279, the spectrum inversion flag generation portion 255 performs a selection setting process for controlling the selection to be made by the selection portion 114 based on the value of the spectrum finalization flag acquired in step S271, on the results of the comparisons made in steps S277 and S278, and on current status.

After determining the value of the spectrum inversion flag to be output and completing the settings for the selection to be made by the selection portion 114 in step S279, the spectrum inversion flag generation portion 255 passes control to step S280.

In step S280, the decoding failure counter 251 and the decoding success counter 252 each determine whether the decoding failure count or the decoding success count has reached the corresponding threshold value (i.e., decoding failure count threshold value or decoding success count threshold value). If it is determined in step S280 that the threshold values have been reached, then the decoding failure counter 251 and decoding success counter 252 pass control to step S281. In step S281, the decoding failure counter 251 and decoding success counter 252 have their counter values reset (initialized), before passing control to step S282. If it is determined in step S280 that either the decoding failure count or the decoding success count has failed to reach the corresponding threshold value, then the decoding failure counter 251 and decoding success counter 252 skip the process of step S281 and go to step S282.

In step S282, the spectrum inversion detection portion 211 determines whether or not to terminate the decoding result evaluation process. If it is determined that the decoding result evaluation process is not to be terminated, then control is returned to step S273 and the subsequent steps are repeated.

If in step S282 it is determined that the decoding result evaluation process is to be terminated, then the spectrum inversion detection portion 211 terminates the decoding result evaluation process, returns control to step S226 in FIG. 6, and terminates the demodulation process.

[Flow of the Selection Setting Process]

Figure 12:
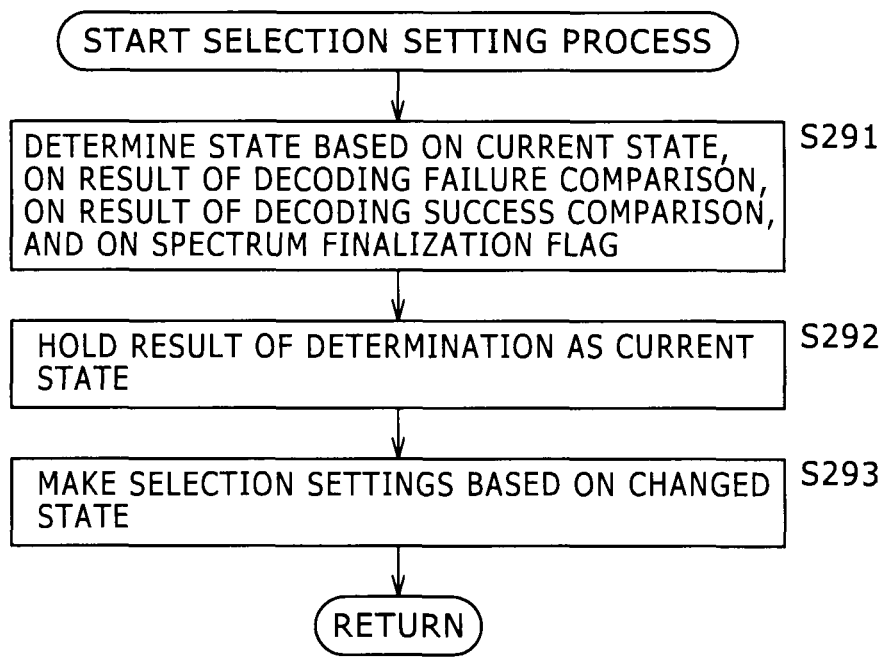
FIG. 12 is a flowchart explanatory of a typical flow of a selection setting process.

Explained below in reference to the flowchart of FIG. 12 is a typical flow of the selection setting process carried out in step S279 of FIG. 11.

When the selection setting process is started, the state determination portion 261 of the spectrum inversion flag generation portion 255 determines in step S291 the most recent state of the spectrum inversion flag generation portion 255 based on the current state of the spectrum inversion flag generation portion 255 obtained the last time, on the result of decoding failure comparison, on the result of decoding success comparison, and on the spectrum finalization flag.

In step S292, the state holding portion 262 holds the result of the determination made in step S291 as the current state.

In step S293, the selection determination portion 263 makes the settings for the selection to be made based on the changed state resulting from the determination of the state in step S291, thereby determining the signal to be selected by the selection portion 114.

After making the settings for the selection in step S293, the spectrum inversion flag generation portion 255 terminates the selection setting process, returns control to step S279 in FIG. 11, and causes the steps subsequent to step S280 to be carried out.

When the various processes are performed as explained above, the receiving apparatus 200 can detect and correct spectrum inversion properly regardless of the error correction system in use. That is, the receiving apparatus 200 can detect and correct spectrum inversion in a more generalized manner than before.

4. Fourth Embodiment

Receiving Apparatus

Figure 13:
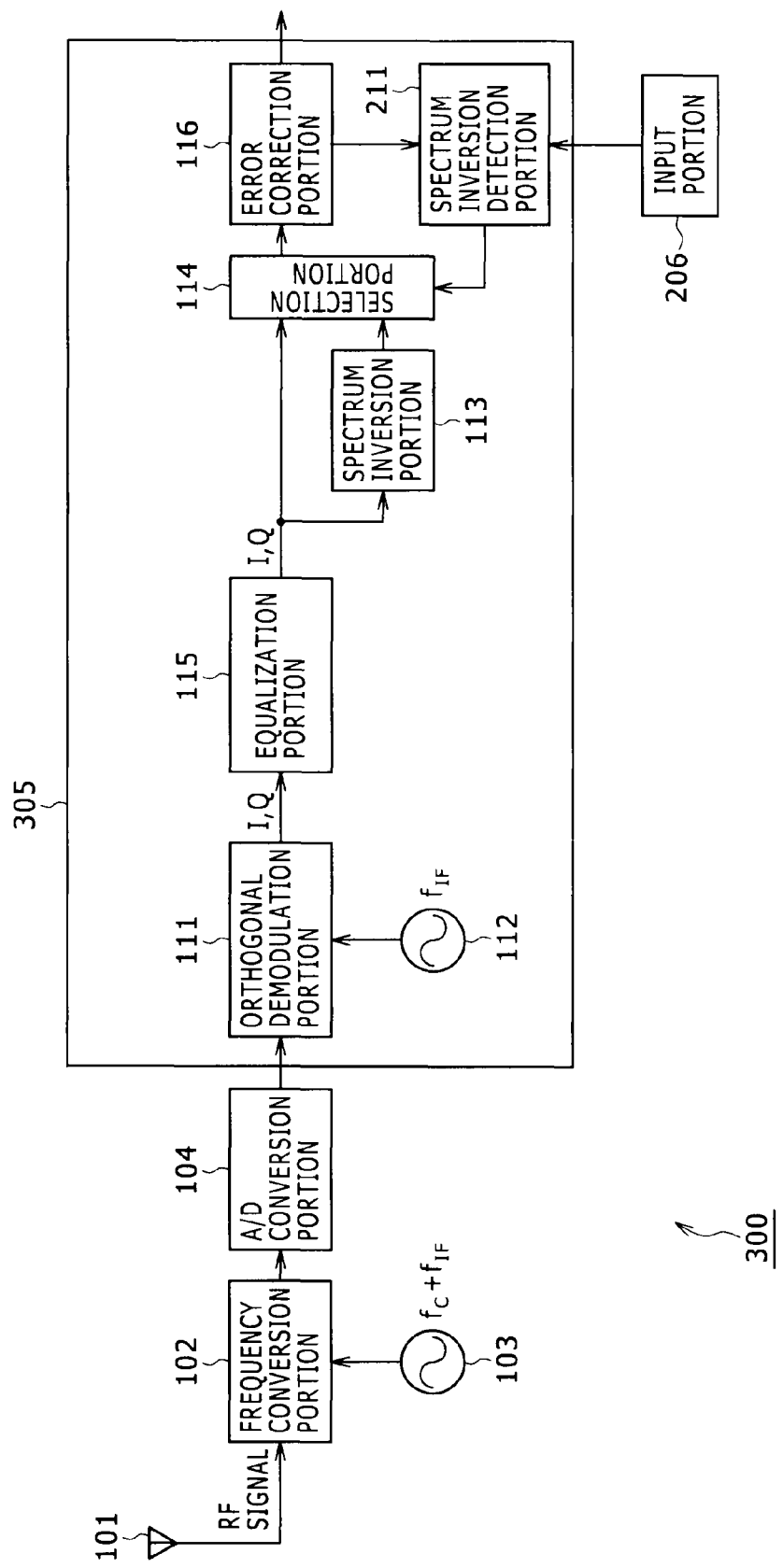
FIG. 13 is a block diagram showing another example of the major structure of the receiving apparatus to which the present disclosure is applied.

Spectrum inversion and signal selection may be carried out alternatively following the equalization process. FIG. 13 is a block diagram showing another example of the major structure of the receiving apparatus to which the present disclosure is applied.

The receiving apparatus 300 shown in FIG. 13 is basically the same in structure as the receiving apparatus 200 in FIG. 4 and performs basically the same processes carried out by the receiving apparatus 200. However, unlike the receiving apparatus 200, the receiving apparatus 300 has the spectrum inversion portion 113 and selection portion 114 furnished interposingly between the equalization portion 115 and the error correction portion 116.

That is, in the case of the receiving apparatus 300, the equalization portion 115 performs the equalization process on the I and Q signal output from the orthogonal demodulation portion 111. The spectrum inversion portion 113 performs the spectrum inversion process on the I and Q signal having been equalized.

Also, the selection portion 114 selects either the equalized I and Q signals output from the equalization portion 115 or the output of the spectrum inversion portion 113. The selection portion 114 supplies the selected signals to the error correction portion 116.

In the case of the receiving apparatus 200 in FIG. 4, if the selection portion 114 changes the selected signals, the newly selected signal is subjected to the equalization process performed by the equalization portion 115 before being fed to the error correction portion 116 for error correction decoding. That is, when the selection portion 114 changes the selected signals, there is a delay caused by the equalization process of the equalization portion 115.

In the case of the receiving apparatus 300, on the other hand, the equalization process is carried out upstream of the selection portion 114. It follows that when the selection portion 114 changes the selected signal, there is no delay stemming from the equalization process.

As explained above, the receiving apparatus 300 can detect and correct spectrum inversion in the same generalized manner as the receiving apparatus 200. In addition to this, the receiving apparatus 300 can suppress any increase in the delay time attributable to the changing of the selected signals by the selection portion 114.

[Flow of the Demodulation Process]

Figure 14:
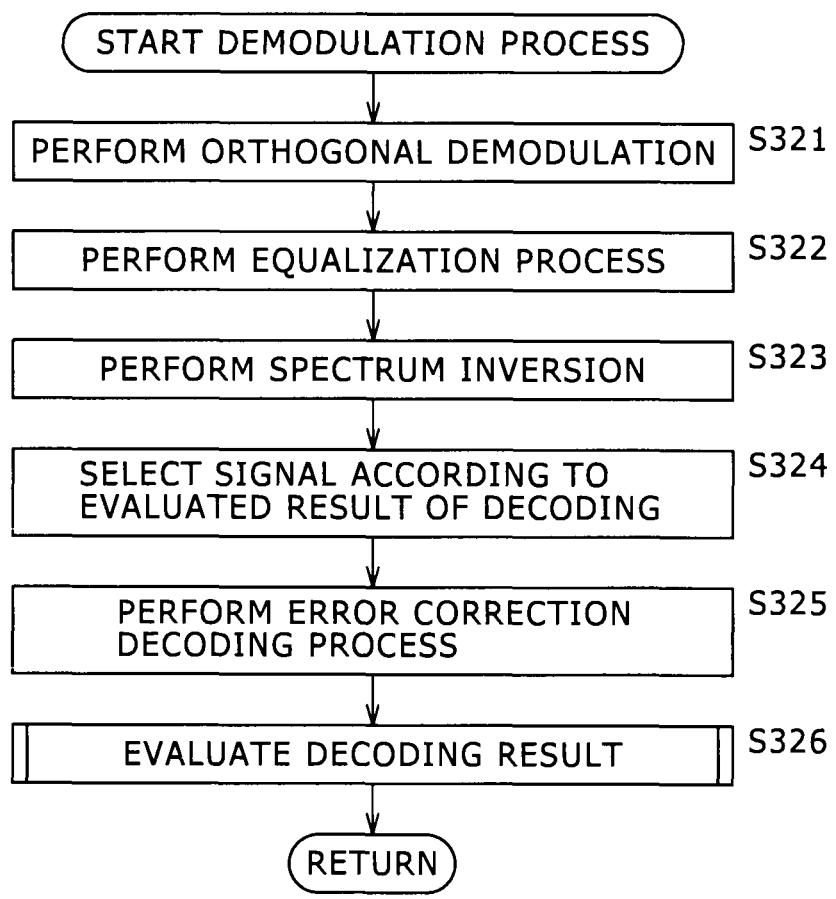
FIG. 14 is a flowchart explanatory of another typical flow of the demodulation process.

Explained below in referenced to the flowchart of FIG. 14 is a typical flow of the demodulation process in the case of the receiving apparatus 300. As shown in the flowchart of FIG. 14, the steps of the demodulation process performed by the receiving apparatus 300 are substantially the same as those of the demodulation process carried out by the receiving apparatus 200 and discussed above in reference to the flowchart of FIG. 6. The difference lies in the sequence of the steps varying between the two cases.

That is, step S321 in FIG. 14 is processed in the same manner as step S221 in FIG. 6. Step S322 in FIG. 14 is processed in the same manner as step S224 in FIG. 6. Also, steps S323 and S324 in FIG. 14 are processed in the same manner as steps S222 and S223 in FIG. 6. Furthermore, steps S325 and S326 in FIG. 14 are processed in the same manner as steps S225 and S226 in FIG. 6.

When the various processes are carried out as explained above, the receiving apparatus 300 can detect and correct spectrum inversion in a more generalized manner than before while suppressing any increase in the delay time attributable to the changing of the selected signals by the selection portion 114.

5. Fifth Embodiment

Receiving Apparatus

Figure 15:
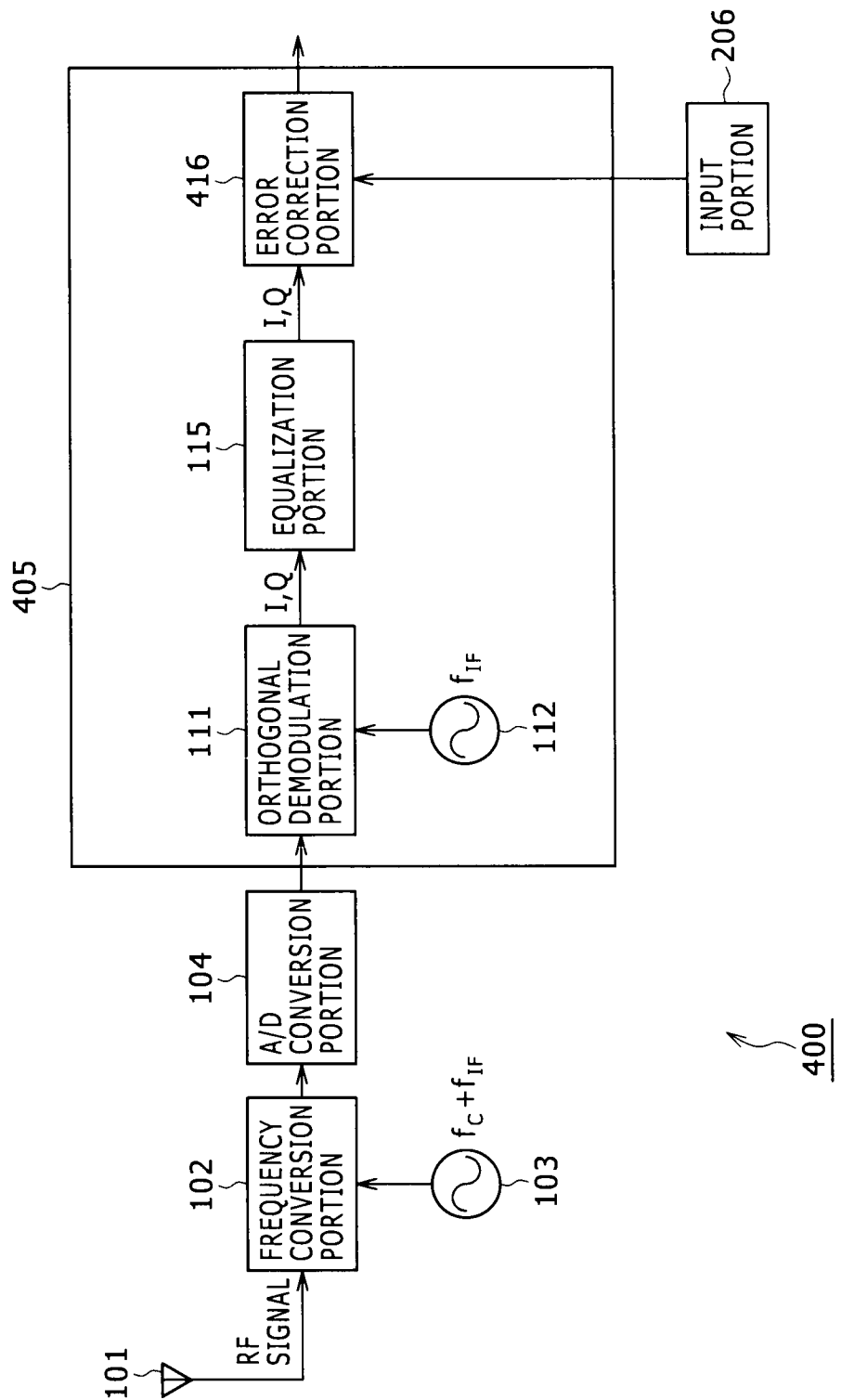
FIG. 15 is a block diagram showing another example of the major structure of the receiving apparatus to which the present disclosure is applied.

Spectrum inversion and signal selection may be carried out further downstream in another embodiment. FIG. 15 is a block diagram showing another example of the major structure of the receiving apparatus to which the present disclosure is applied.

The receiving apparatus 400 shown in FIG. 15 is basically the same in structure as the receiving apparatus 200 in FIG. 4 and performs basically the same processes carried out by the receiving apparatus 200. However, unlike the receiving apparatus 200, the receiving apparatus 400 has a demodulation portion 405 replacing the demodulation portion 205. The demodulation portion 405 is basically the same in structure as the demodulation portion 205 and performs basically the same processes carried out by the demodulation portion 205. The difference is that the demodulation portion 405 has an error correction portion 416 replacing the error correction portion 116.

The error correction portion 416 is basically the same in structure as the error correction portion 116 and performs basically the same processes carried out by the error correction portion 116. It should be noted that the error correction portion 416 has a spectrum inversion portion 432 and a selection portion 433, corresponding to the spectrum inversion portion 113 and the selection portion 114, furnished inside.

[Error Correction Portion]

Figure 16:
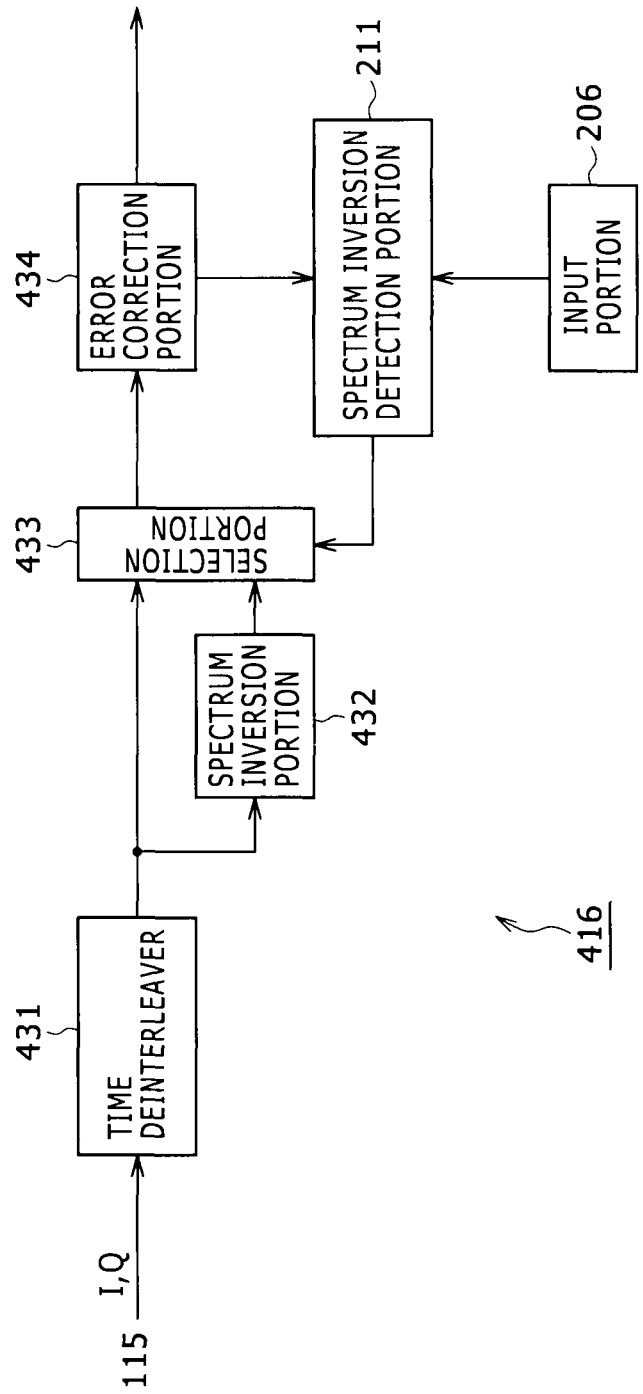
FIG. 16 is a block diagram showing an example of a major structure of an error correction portion.

FIG. 16 is a block diagram showing an example of a major structure of the error correction portion 416.

As shown in FIG. 16, the error correction portion 416 includes a time deinterleaver 431, the spectrum inversion portion 432, the selection portion 433, an error correction decoding portion 434, and a spectrum inversion detection portion 211.

For this fifth embodiment, it is assumed that the transmitting side transmits signals having undergone time interleave (convolutional interleave).

Whereas a signal that was time-interleaved on the transmitting side should be time-deinterleaved on the receiving side, the delay involved in time-deinterleaving the signal is considerable. Under the DTMB system, for example, the delay attributable to such time deinterleave can amount to 318 ms or thereabout. Where the spectrum inversion process is performed upstream of time deinterleave and where the signal is to be spectrally inverted following detection of the inversion by a spectrum inversion detector, there occurs a delay in which the spectrally inverted signal should complete time deinterleave before being output. That delay is not negligible.

In order to bypass the above bottleneck, time deinterleave may be arranged to be carried out upstream of spectrum inversion and signal selection.

The time deinterleaver 431 performs time deinterleave corresponding to the time interleave carried out by the transmitting apparatus. The spectrum inversion portion 432 performs spectrum inversion on the I and Q signals having undergone the time deinterleave. The selection portion 433 selects either the time-deinterleaved I and Q signals output from the time deinterleaver 431 or the spectrally inverted I and Q signals output from the spectrum inversion portion 432 in accordance with the result of spectrum inversion detection by the spectrum inversion detection portion 211, and feeds the selected signals to the error correction decoding portion 434.

As with the error correction portion 116, the error correction decoding portion 434 performs error correction on the received signals, sends the corrected signals out of the error correction portion 416, and supplies information on the error correction to the spectrum inversion portion 211.

When time deinterleave is performed upstream of the signal selection by the selection portion 433 as described above, the receiving apparatus 400 can not only detect and correct spectrum inversion in a generalized manner like the receiving apparatus 200 but also suppress any increase in the delay time stemming from the changing of the selected signals by the selection portion 433.

[Flow of the Demodulation Process]

Figure 17:
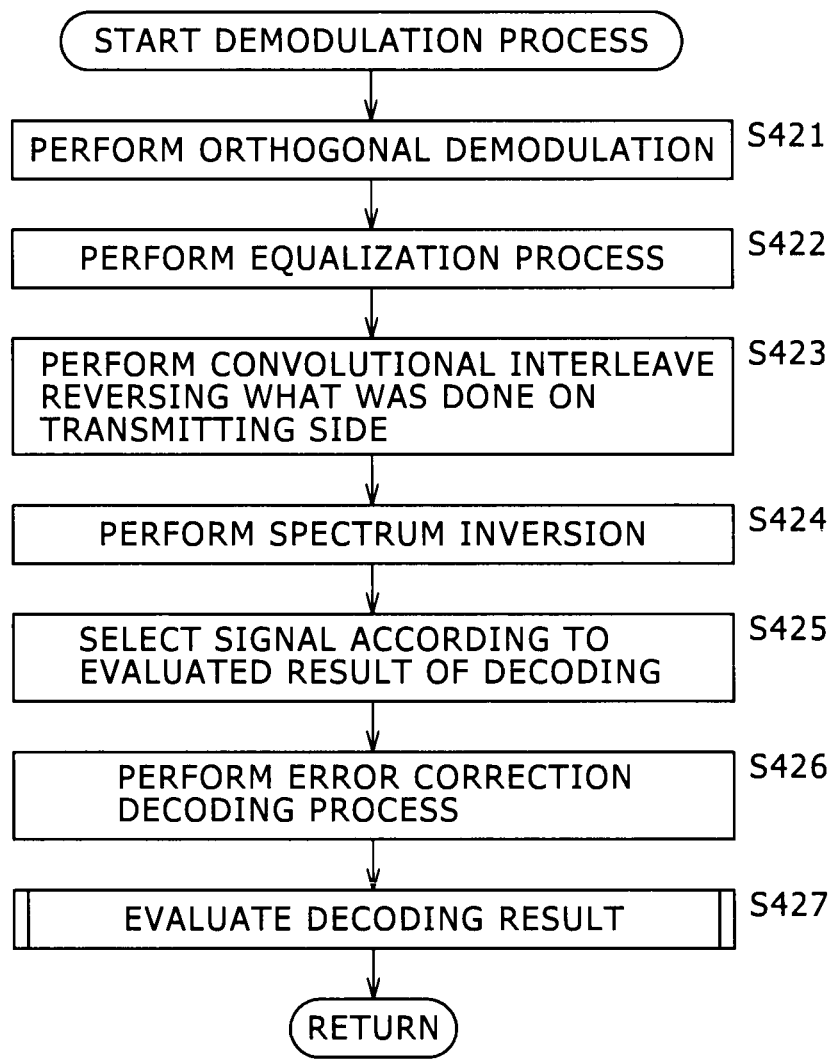
FIG. 17 is a flowchart explanatory of another typical flow of the demodulation process.

Explained below in reference to the flowchart of FIG. 17 is a typical flow of the demodulation process performed by the demodulation portion 405 of the receiving apparatus 400. This demodulation process is carried out in basically the same manner as the demodulation process performed by the demodulation portion 305 as explained above in reference to the flowchart of FIG. 14.

Steps S421 and S422 are processed in the same manner as steps S321 and S322 in FIG. 14. In step S423, the time deinterleaver 431 performs convolutional deinterleave reversing what was done on the transmitting side.

Steps S424 through S427 are processed in the same manner as steps S323 through S326 in FIG. 14.

When the demodulation process is carried out as explained above, the receiving apparatus 400 can not only detect and correct spectrum inversion in a generalized manner like the receiving apparatus 200 but also suppress any increase in the delay time stemming from the changing of the selected signals by the selection portion 433.

6. Sixth Embodiment

Error Correction Portion

The above-described error correction portion 416 may also be applied to a setup where NR (Nordstrom Robinson) coded signals are received.

Figure 18:
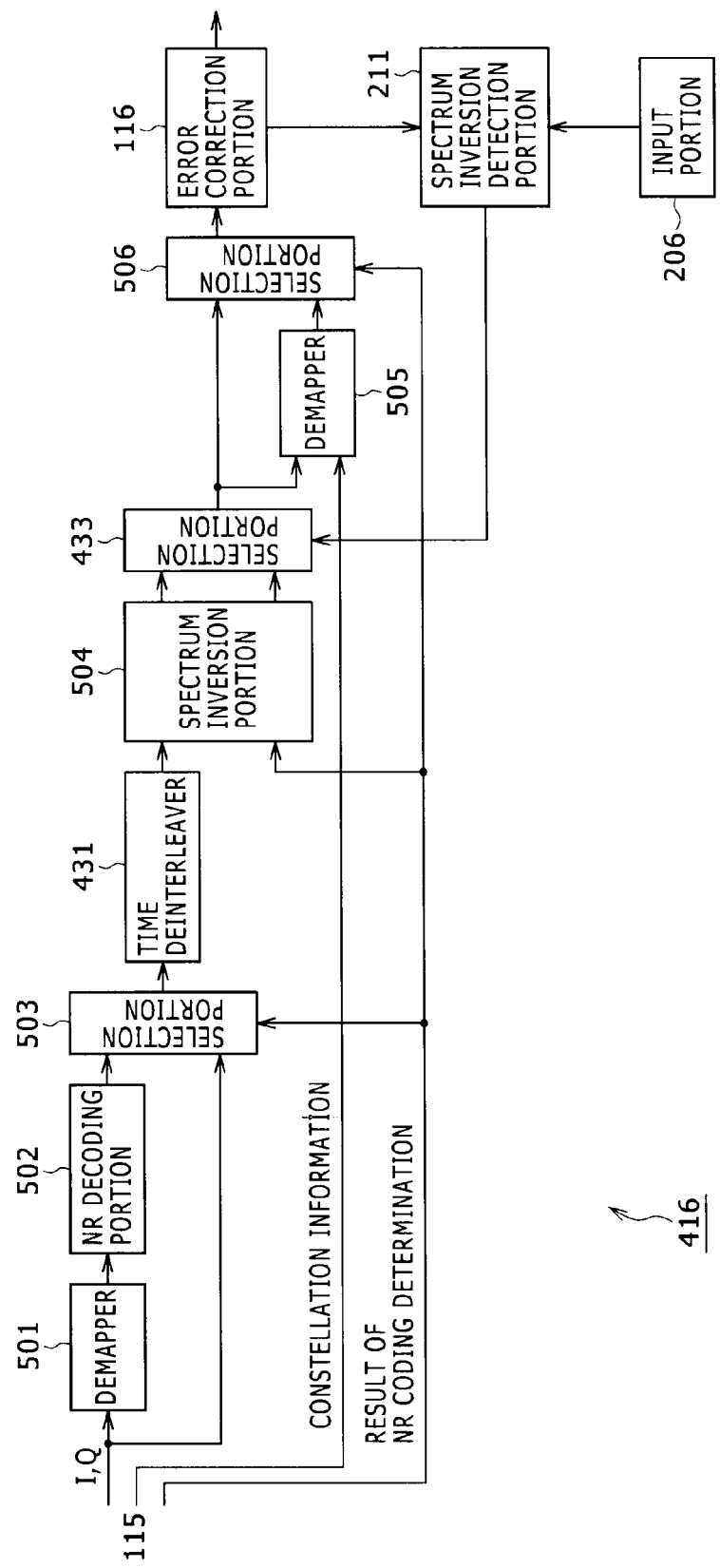
FIG. 18 is a block diagram showing another example of the major structure of the error correction portion.

FIG. 18 is a block diagram showing such an example of the major structure of the error correction portion 416. The error correction portion 416 shown in FIG. 18 can suppress any increase in the delay time attributable to the automatic detection of spectrum inversion as well as to time deinterleave even upon receiving, for example, signals having undergone NR (Nordstrom Robinson) coding under the DTMB system.

Where NR coding is not performed under the DTMB system, a bit sequence having undergone error correction coding (BCH (Bose-Chaudhuri-Hocquenghem) coding and LDPC (Low Density Parity Check) coding is mapped to the constellation points of 4-QAM (Quadrature Amplitude Modulation), 16-QAM, 32-QAM, or 64-QAM, before being time-interleaved per constellation point.

Where NR coding is performed, the bit sequence having undergone error correction coding (BCH coding and LDPC coding) is time-interleaved per bit. The time-interleaved bit sequence is NR-coded at intervals of eight bits so as to generate a 16-bit NR code word. The bit sequence of this NR code word is mapped to the constellation points of 4-QAM.

Thus upon receipt of the NR-coded signal, it is necessary to carry out demapping and NR decoding upstream of the time deinterleaver on the receiving side. That means the spectrum inversion process should be performed upstream of the time interleaver, with the result that a delay stemming from the time deinterleaver may not be eliminated.

In order to bypass the above bottleneck, the error correction portion 416 is structured as shown in FIG. 18. As illustrated in FIG. 18, this error correction portion 416 has a spectrum inversion portion 504 replacing the spectrum inversion portion 432 and includes a demapper 501, an NR decoding portion 502, a selection portion 503, a demapper 505, and a selection portion 506.

Assuming that the input I and Q signals have been mapped to 4-QAM, the demapper 501 calculates the likelihood of each bit in a bit sequence being "0" (or "1") corresponding to a constellation point of 4-QAM. The demapper 501 computes the likelihood of two bits per constellation point (i.e., per pair of I and Q).

Having acquired the likelihoods from the demapper 501, the NR decoding portion 502 divides them into units of 16 bits for NR decoding (16 bits correspond to one NR code word). The NR decoding portion 502 performs NR decoding assuming both that spectrum inversion is absent and that spectrum inversion is present, and outputs the results of NR decoding for both the presence and the absence of spectrum inversion.

If it is assumed that spectrum inversion is present, the order of the input likelihoods per 16 bits may be rearranged into what is explained below for example.

That is, the NR decoding portion 502 may initially switch the 0th likelihood with the first likelihood, followed by the second switched with the third, by the fourth with the fifth, by the sixth with the seventh, by the eighth with the ninth, by the tenth with the eleventh, by the twelfth with the thirteenth, and by the fourteenth with the fifteenth.

Given the result of NR coding determination output from the NR decoding portion 502, the selection portion 503 selects the output of the NR decoding portion 502 if NR coding has been performed and sends the selected output to the time deinterleaver 431. If NR coding has not been performed, the selection portion 503 selects the input I and Q signals and supplies the selected signals to the time deinterleaver 431.

The time deinterleaver 431 sends the deinterleaved signal to the spectrum inversion portion 504.

The spectrum inversion portion 504 acquires the output of the time deinterleaver 431 and the result of NR coding determination. Based on the result of NR coding determination, the spectrum inversion portion 504 determines whether or not NR coding has been performed.

Where NR coding has been performed, the time deinterleaver 431 outputs two results of NR decoding from the NR decoding portion 502, i.e., the result of NR decoding performed where spectrum inversion is assumed to be absent, and the result of NR decoding performed where spectrum inversion is assumed to be present. The spectrum inversion portion 504 thus outputs these two results and feeds them to the selection portion 433.

Where NR coding has not been performed, the time deinterleaver 431 outputs "I, Q." In turn, the spectrum inversion portion 504 outputs "I, Q" and "Q, I" (i.e., I and Q signals have been switched in their positions) and feeds them to the selection portion 433.

That is, if it is determined that NR coding has been performed based on the result of NR coding determination, the spectrum inversion portion 504 separates the two results of NR decoding fed from the time deinterleaver 431. The spectrum inversion portion 504 supplies the separated results as two separate outputs to the selection portion 433.

If it is assumed that NR coding has not been performed based on the result of NR coding determination, the spectrum inversion portion 504 spectrally inverts "I, Q" fed from the time deinterleaver 431 and supplies "I, Q" and "Q, I" as two separate outputs to the selection portion 433.

Given the input I and Q signals, the demapper 505 calculates the likelihood of each bit in a bit sequence being "0" (or "1") corresponding to a QAM constellation point in accordance with the constellation information (4-QAM, 16-QAM, 32-QAM or 64-QAM).

The likelihood is calculated for two bits under 4-QAM, for four bits under 16-QAM, for five bits under 32-QAM, or for six bits under 64-QAM per constellation point (a pair of I and Q).

Based on the result of NR coding determination, the selection portion 506 selects the output of the selection portion 433 if NR coding has been performed and feeds the selected output to the error correction decoding portion 434. The selection portion 506 selects the output of the demapper 505 if NR coding has not been performed and supplies the selected output to the error correction decoding portion 434.

The error correction decoding portion 434 outputs the result of decoding (i.e., result of hard decision) and a decoding failure flag.

[Spectrum Inversion Portion]

Figure 19:
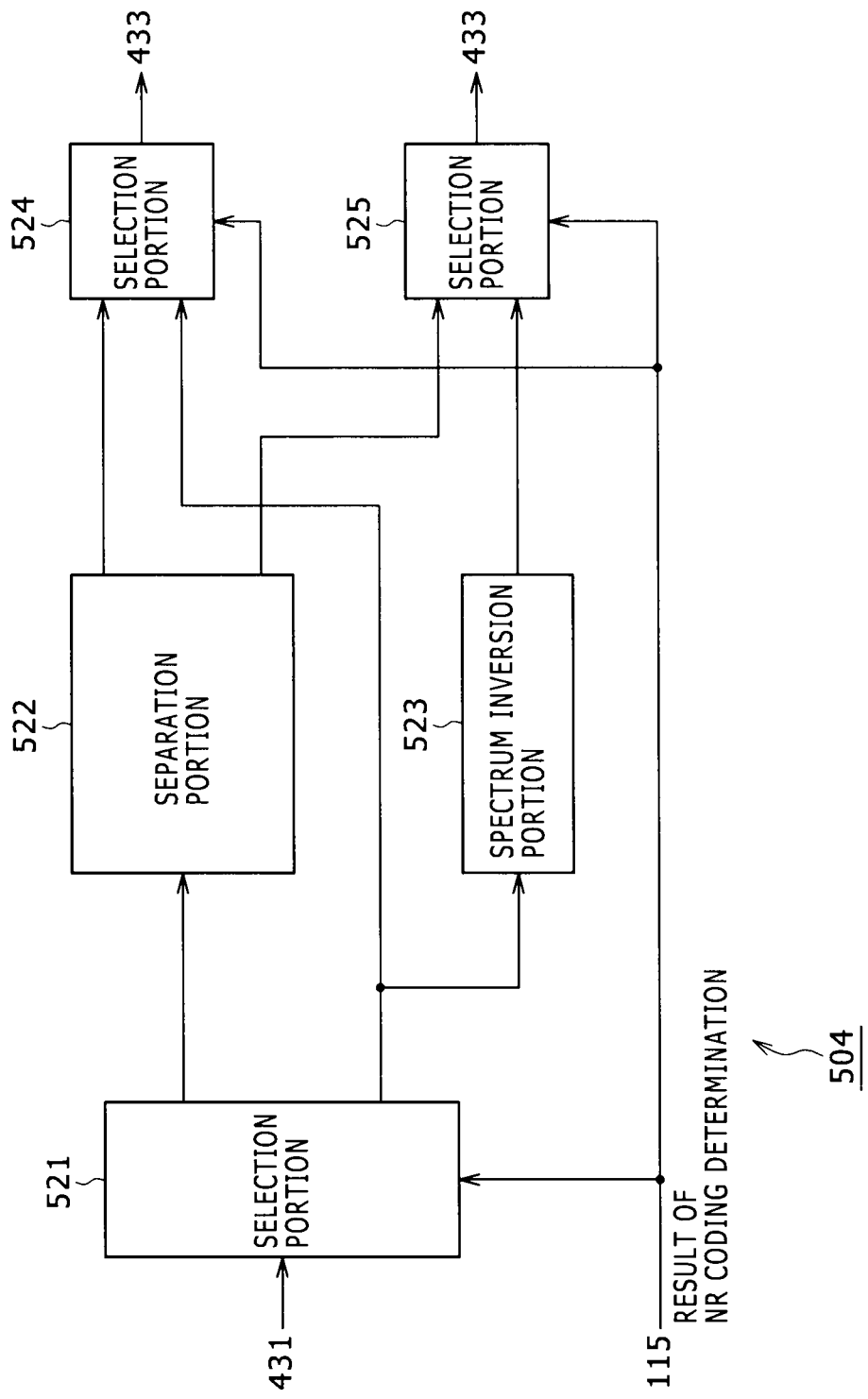
FIG. 19 is a block diagram showing an example of a major structure of a spectrum inversion portion.

FIG. 19 is a block diagram showing an example of a major structure of the spectrum inversion portion 504 shown in FIG. 18. As illustrated in FIG. 19, the spectrum inversion portion 504 includes a selection portion 521, a separation portion 522, a spectrum inversion portion 523, a selection portion 524, and a selection portion 525.

Based on the result of NR coding determination, the selection portions 521, 524 and 525 determine whether the signal fed from the time deinterleaver 431 is NR-coded.

If it is determined that the supplied signal is NR-coded, the selection portion 521 feeds the output of the time deinterleaver 431 to the separation portion 522. The separation portion 522 separates the two results of NR decoding included in the signal fed from the selection portion 521 (i.e., into the result of NR decoding in effect when spectrum inversion is assumed to be absent, and the result of NR decoding in effect when spectrum inversion is assumed to be present).

The separation portion 522 supplies the selection portion 524 with the separated result of NR decoding performed when spectrum inversion is assumed to be present, and feeds the selection portion 525 with another separated result of NR decoding performed when spectrum inversion is assumed to be absent.

If it is determined that the supplied signal is NR-coded, the selection portions 524 and 525 select the signal fed from the separation portion 522 and send the selected signal to the selection portion 433.

If it is determined that the supplied signal is not NR-coded, the selection portion 521 feeds the output of the time deinterleaver 431 to the selection portion 524 and spectrum inversion portion 523. In turn, the spectrum inversion portion 523 spectrally inverts the signal from the selection portion 521 and supplies the spectrally inverted signal to the selection portion 525.

If it is determined that the selected signal is not NR-coded, the selection portions 524 and 525 select the signal from either the selection portion 521 or the spectrum inversion portion 523 and feed the selected signal to the selection portion 433.

In the above-described structure, the error correction portion 416 can detect spectrum inversion upon receipt of NR-coded signals under the DTMB system and reduce the delay attributed to the time deinterleaver.

That is, the receiving apparatus 400 can not only detect and correct spectrum inversion in a more generalized manner than before but also suppress any increase in the delay time stemming from the changing of the selected signals by the selection portion 433.

[Flow of the Demodulation Process]

Figure 20:
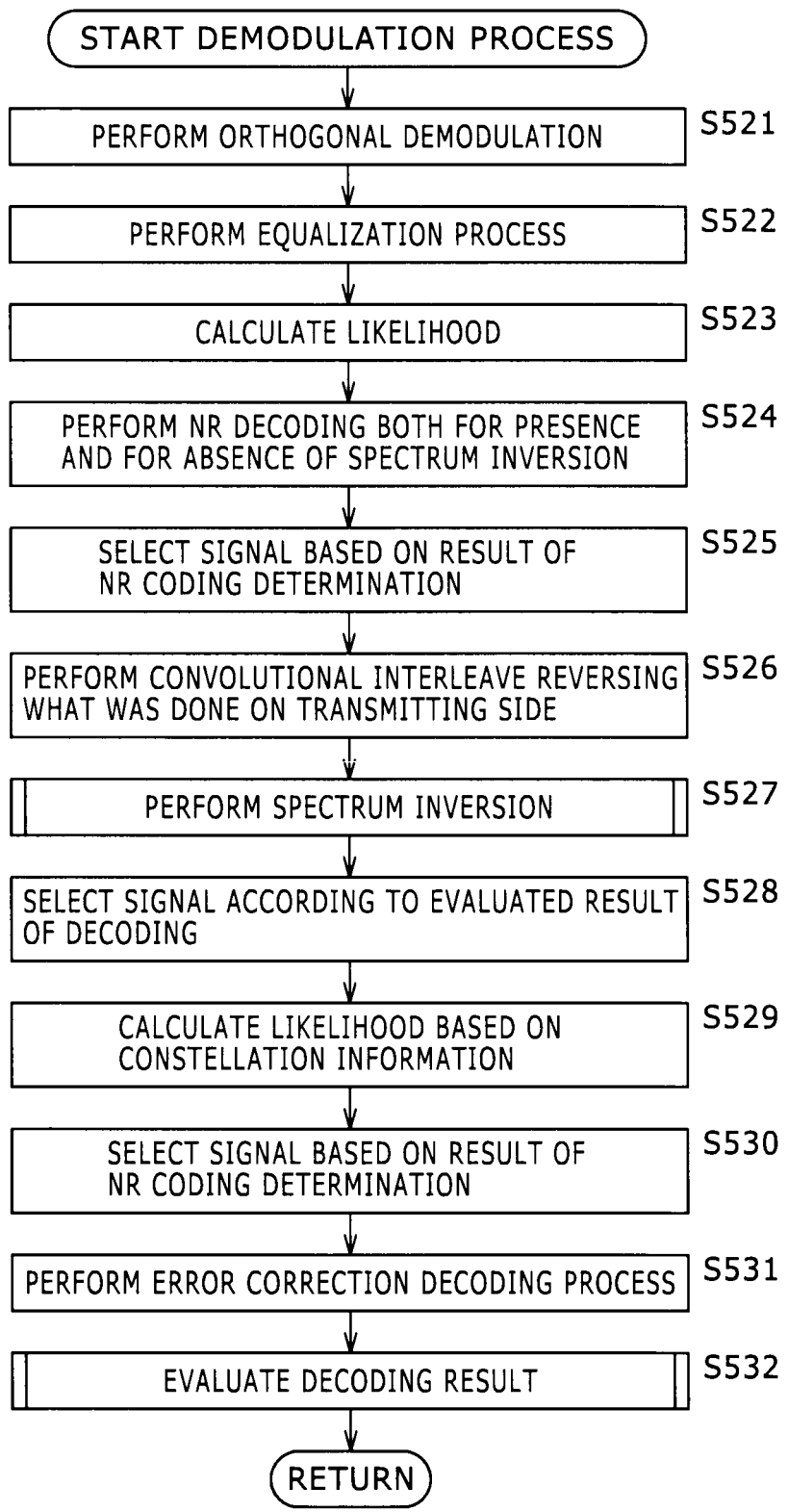
FIG. 20 is a flowchart explanatory of another typical flow of the demodulation process.

Explained below in reference to the flowchart of FIG. 20 is a typical flow of the demodulation process in the preceding case. This demodulation process is performed basically in the same manner as the demodulation process explained above in reference to the flowchart of FIG. 17.

Steps S521 and S522 are processed in the same manner as steps S421 and S422 in FIG. 17.

In step S523, the demapper 501 calculates likelihood. In step S524, the NR decoding portion 502 performs NR decoding both for the presence and for the absence of spectrum inversion. In step S525, based on the result of NR coding determination, the selection portion 503 selects either the I and Q signals input to the error correction portion 416 or the output of the NR decoding portion 502, and supplies what is selected to the time deinterleaver.

Step S526 is processed in the same manner as step S423 in FIG. 17.

In step S527, the spectrum inversion portion 504 performs spectrum inversion on the input signal as needed. Step S528 is processed in the same manner as step S425 in FIG. 17.

In step S529, the demapper 505 calculates likelihood in accordance with constellation information. In step S530, based on the result of NR coding determination, the selection portion 506 selects either the output of the selection portion 433 or the output of the demapper 505.

Steps S531 and S532 are processed in the same manner as steps S426 and S427 in FIG. 17.

Upon completion of the process of step S532, the error correction portion 416 terminates the demodulation process.

[Flow of the Spectrum Inversion Process]

Figure 21:
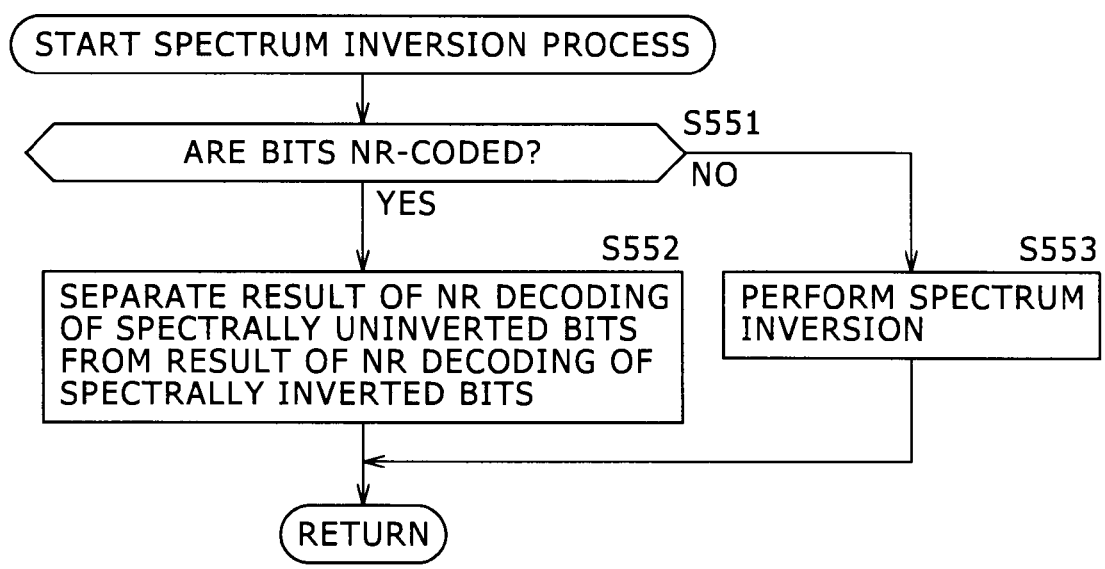
FIG. 21 is a flowchart explanatory of a typical flow of a spectrum inversion process.

Explained below in reference to the flowchart of FIG. 21 is a typical flow of the spectrum inversion process performed by the spectrum inversion portion 504.

When the spectrum inversion process is started, the selection portions 521, 524 and 525 determine in step S551 whether NR coding has been performed based on the result of NR coding determination. If it is determined that NR coding has been performed, the selection portions 521, 524 and 525 pass control to step S552.

In step S552, the separation portion 522 separates the result of NR decoding given performed spectrum inversion is absent, from the result of NR decoding performed when spectrum inversion is present. Upon completion of the process of step S552, the spectrum inversion portion 504 terminates the spectrum inversion process, returns control to step S527 in FIG. 20, and allows the step S528 and subsequent steps to be carried out.

If in step S551 of FIG. 21 it is determined that NR coding has not been performed, the selection portions 521, 524 and 525 pass control to step S553.

In step S553, the spectrum inversion portion 523 spectrally inverts the output of the time deinterleaver 431 fed via the selection portion 521. Upon completion of the process of step S553, the spectrum inversion portion 504 terminates the spectrum inversion process, returns control to step S527 in FIG. 20, and allows step S528 and subsequent steps to be carried out.

Where the various processes are carried out as explained above, the receiving apparatus 400 can not only detect and correct spectrum inversion in a generalized manner like the receiving apparatus 200 but also suppress any increase in the delay time stemming from the changing of the selected signals by the selection portion 433.

7. Seventh Embodiment

Receiving Apparatus

The foregoing paragraphs have explained the present disclosure in conjunction with the receiving apparatuses for receiving single carrier signals. Alternatively, the present disclosure may also be applied to a receiving apparatus capable of receiving not only single carrier signals but also multi-carrier signals.

Figure 22:
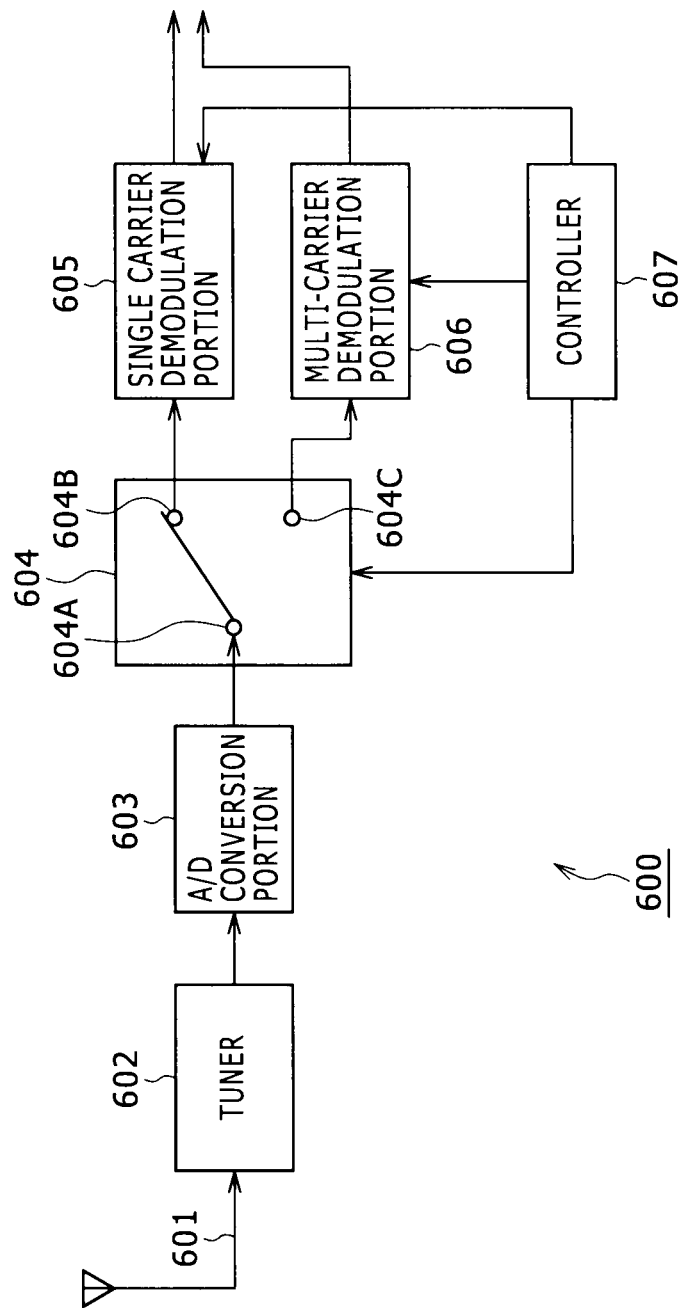
FIG. 22 is a block diagram showing another example of the major structure of the receiving apparatus to which the present disclosure is applied.

FIG. 22 is a block diagram showing another example of the major structure of a receiving apparatus 600 to which the present disclosure is applied.

As shown in FIG. 22, this receiving apparatus 600 is made up of an antenna 601, a tuner 602, an A/D conversion portion 603, a switching portion 604, a single carrier demodulation portion 605, a multi-carrier demodulation portion 606, and a controller 607. For example, the receiving apparatus 600 may be an apparatus that complies with the DTMB (Digital Terrestrial Multimedia Broadcast) standard for terrestrial digital broadcasts.

According to the DTMB standard, it is possible to select either a single carrier modulation system or a multi-carrier modulation system as the modulation system. Receiving apparatuses that comply with the DTMB standard are each provided with the capability to demodulate data transmitted by the signal carrier modulation system and the capability to demodulate data sent by the multi-carrier modulation system.

In the description that follows, where appropriate, single carrier transmission will refer to the setup where data is transmitted by the single carrier modulation system, and multi-carrier transmission will refer to the setup where data is transmitted by the multi-carrier modulation system.

The tuner 602 receives an RF signal, acquires an IF signal through frequency conversion of the received signal, and outputs the IF signal thus obtained to the A/D conversion portion 603.

The A/D conversion portion 603 converts from analog to digital format the signal fed from the tuner 602, and outputs the data thus obtained.

Under control of the controller 607, the switching portion 604 switches the destinations to which the data fed from the A/D conversion portion 603 is output. Where the data transmitted by single carrier transmission is to be demodulated, the switching portion 604 connects a switch 604A to a terminal 604B to let the data fed from the A/D conversion portion 603 be output to the single carrier demodulation portion 605. Where the data transmitted by multi-carrier transmission is to be demodulated, the switching portion 604 connects the switch 604A to a terminal 604C to let the data supplied from the A/D conversion portion 603 be output to the multi-carrier demodulation portion 606.

The single carrier demodulation portion 605 demodulates the data fed from the switching portion 604 under control of the controller 607, and outputs the data thus obtained.

The multi-carrier demodulation portion 606 demodulates the data supplied from the switching portion 604 under control of the controller 607, and outputs the data thus acquired. If multi-carrier transmission is effected under the OFDM system, what is input to the multi-carrier demodulation portion 606 is a baseband OFDM signal acquired by a processing portion (not shown) carrying out orthogonal demodulation on the output of the A/D conversion portion 603.

The data demodulated by the single carrier demodulation portion 605 or multi-carrier demodulation portion 606 is forwarded to downstream processing portions for appropriate processes, for example.

The controller 607 executes relevant programs so as to control the entire receiving apparatus 600 in operation. For example, depending on whether the modulation system used by the currently received channel is single carrier transmission or multi-carrier transmission, the controller 607 controls the switching portion 604 to switch the destinations to which to output data.

It is possible to utilize as the above-described single carrier demodulation portion 605 any one of the receiving apparatuses which are explained above in conjunction with the first through the sixth embodiments and which are capable of receiving single carrier signals.

Thus as with the receiving apparatuses discussed above, the receiving apparatus 600 can detect and correct spectrum inversion in a more generalized manner than before.

8. Eighth Embodiment

Personal Computer

The series of the processes described above may be executed either by hardware or by software. In such cases, the processes may be carried out using a personal computer such as one shown in FIG. 23.

In the personal computer 700 of FIG. 23, a CPU (central processing unit) 701 performs various processes in accordance with the programs held in a ROM (read only memory) 702 or with the programs loaded from a storage device 713 into a RAM (random access memory) 703. The RAM 703 may also accommodate data that may be needed by the CPU 701 carrying out its diverse processing.

The CPU 701, ROM 702, and RAM 703 are interconnected via a bus 704. An input/output interface 710 is also connected to the bus 704.

The input/output interface 710 is connected with an input device 711 usually composed of a keyboard and a mouse; an output device 712 generally made up of a display unit such as CRT (cathode ray tube) or LCD (liquid crystal display) and speakers; the storage device 713 constituted by a hard disk or the like; and a communication device 714 formed by a modem or the like. The communication device 714 conducts communication processes over networks including the Internet.

A drive 715 may also be connected as needed to the input/output interface 710. A piece of removable media 721 such as magnetic disks, optical disks, magneto-optical disks and semiconductor memories may be attached to the drive 715. Computer programs retrieved from the attached recording medium may be installed as needed into the storage device 713.

Where the series of the processes above are to be executed by software, the programs constituting the software may be installed over networks or from a suitable recording medium into the computer.

As shown in FIG. 23, the recording medium is offered to users not only as the removable media 721 apart from their apparatuses and constituted by magnetic disks (including flexible disks), optical disks (including CD-ROM (Compact Disc-Read Only Memory) and DVD (Digital Versatile Disc)), magneto-optical disks (including MD (MiniDisc), or semiconductor memories; but also in the form of the ROM 702 or the hard disk in the storage device 713, each accommodating the programs and incorporated beforehand in the users' apparatuses.

The programs for execution by the computer may be carried out in the sequence depicted in this specification (i.e., on a time series basis), in parallel fashion, or individually when they are invoked as needed.

Also in this specification, the steps describing the programs stored on the recording medium represent not only the processes that are to be carried out in the depicted sequence (i.e., on a time series basis) but also processes that may be performed parallelly or individually and not necessarily chronologically.

Also in this specification, the term "system" refers to an entire configuration made up of a plurality of component devices.

Any structure explained in the foregoing paragraphs as one device (or processing portion) may be divided into a plurality of devices (or processing portions). Conversely, the structures explained above as a plurality of devices (or processing portions) may be unified into one device (or processing portion). Also, each device (or processing portion) may obviously be supplemented with a structure or structures other than those discussed above. Furthermore, part of the structure of a device (or processing portion) may be included in the structure of another device (or processing portion), provided the structures and the workings remain substantially the same for the system as a whole. Thus it should be understood that the present disclosure when embodied is not limited to the above-described embodiments and that various modifications, variations and alternatives may be made of the disclosure so far as they are within the scope of the appended claims or the equivalents thereof.

The present disclosure contains subject matter related to that disclosed in Japanese Priority Patent Application JP 2010-240783 filed in the Japan Patent Office on Oct. 27, 2010, the entire content of which is hereby incorporated by reference.

What is claimed is:

1. A signal processing apparatus comprising:
  a detection section configured such that based on a result of error correction of a signal generated by a single carrier system, said detection section detects the presence or absence of spectrum inversion in said signal; and
  a selection section configured such that if said detection section detects said spectrum inversion, said selection section selects a spectrally inverted signal as input signal subject to said error correction, and that if said detection section does not detect said spectrum inversion, then said selection section selects a spectrally uninverted signal as said input signal subject to said error correction,
  wherein, if a number of code words not successfully corrected through said error correction is not smaller than a predetermined threshold value, then said detection section causes said selection section to change selected signals.

2. The signal processing apparatus according to claim 1, wherein, if said number of code words not successfully corrected through said error correction is not smaller than said predetermined threshold value with regard to said predetermined number of code words having undergone said error correction, then said detection section causes said selection section to change selected signals.

3. The signal processing apparatus according to claim 1, wherein, if said number of code words corrected successfully through said error correction is not smaller than said predetermined threshold value, then said detection section causes said selection section not to change said selected signals until said number of said code words not successfully corrected through said error correction is not smaller than said predetermined threshold value more than once.

4. The signal processing apparatus according to claim 1, further comprising a spectrum inversion section configured to spectrally invert said signal;
  wherein, based on a result of said detection of said spectrum inversion by said detection section, said selection section selects either said signal or the signal spectrally inverted by said spectrum inversion section as said input signal subject to said error correction.

5. The signal processing apparatus according to claim 1, further comprising an equalization section configured to perform an equalization process on said signal selected by said selection section as said input signal subject to said error correction.

6. The signal processing apparatus according to claim 1, further comprising an equalization section configured to perform an equalization process on said signal;
  wherein, if said detection section detects said spectrum inversion, then said selection section selects said signal equalized by said equalization section before being spectrally inverted as said input signal subject to said error correction; and
  if said detection section does not detect said spectrum inversion, then said selection section selects said spectrally uninverted signal equalized by said equalization section as said input signal subject to said error correction.

7. The signal processing apparatus according to claim 6, further comprising a time deinterleave section configured to perform time deinterleave on said equalized signal;
  wherein, if said detection section detects said spectrum inversion, then said selection section selects said time-deinterleaved signal before being spectrally inverted as said input signal subject to said error correction; and
  if said detection section does not detect said spectrum inversion, then said selection section selects said spectrally uninverted time-deinterleaved signal as said input signal subject to said error correction.

8. The signal processing apparatus according to claim 7, further comprising:
  a demapping section configured to perform a demapping process on said equalized signal; and
  an NR decoding section configured to perform NR decoding on said demapped signal, wherein NR stands for Nordstrom Robinson;
  wherein said time deinterleave section performs said time deinterleave on said NR-decoded signal.

9. A signal processing method, said method comprising:
  in a signal processing apparatus:
    detecting presence or absence of spectrum inversion in a signal generated by a single carrier system based on a result of the error correction of said signal;
    selecting a spectrally inverted signal as input signal subject to said error correction when said spectrum inversion is detected;
    selecting a spectrally uninverted signal as said input signal subject to said error correction when said spectrum inversion is not detected; and changing selected signals when the number of code words not successfully corrected through said error correction is not smaller than a predetermined threshold value.

10. A non-transitory computer-readable storage medium having stored thereon, a computer program having at least one code section for signal processing, said at least one code section being executable by a computer for causing said computer to perform steps comprising:

detecting said presence or absence of spectrum inversion in a signal generated by a single carrier system based on a result of error correction of said signal;

selecting a spectrally inverted signal as input signal subject to said error correction when said spectrum inversion is detected;

selecting a spectrally uninverted signal as said input signal subject to said error correction when said spectrum inversion is not detected; and changing selected signals when the number of code words not successfully corrected through said error correction is not smaller than a predetermined threshold value.

* * * * *